United States Patent
Lei et al.

(10) Patent No.: US 11,751,151 B2
(45) Date of Patent: Sep. 5, 2023

(54) PHYSICAL BROADCAST CHANNEL ENHANCEMENT FOR NEW RADIO LIGHT COMMUNICATIONS

(71) Applicant: QUALCOMM Incorporated, San Diego, CA (US)

(72) Inventors: Jing Lei, San Diego, CA (US); Linhai He, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/180,375

(22) Filed: Feb. 19, 2021

(65) Prior Publication Data

US 2021/0274451 A1 Sep. 2, 2021

Related U.S. Application Data

(60) Provisional application No. 62/983,522, filed on Feb. 28, 2020.

(51) Int. Cl.
*H04W 56/00* (2009.01)
*H04W 8/24* (2009.01)
(Continued)

(52) U.S. Cl.
CPC ........... *H04W 56/001* (2013.01); *H04W 8/24* (2013.01); *H04W 72/0446* (2013.01);
(Continued)

(58) Field of Classification Search
CPC ... H04W 56/001; H04W 8/24; H04W 72/005; H04W 72/0446; H04W 72/0493;
(Continued)

(56) References Cited

U.S. PATENT DOCUMENTS

2017/0013574 A1 1/2017 Zhu et al.
2018/0324720 A1* 11/2018 Ly ........................ H04L 5/005
(Continued)

FOREIGN PATENT DOCUMENTS

CN 110475361 A 11/2019
CN 110521249 A * 11/2019 ............ H04W 56/00

OTHER PUBLICATIONS

5G; NR; Physical channels and modulation (3GPP TS 38.211 Version 15.8.0 Release 15), ETSI Technical Specification, European Telecommunications Standards Institute (ETSI), 650, Route Des Lucioles; F-06921 Sophia-Antipolis; France, vol. 3GPP RAN, No. V15.8.0, Jan. 21, 2020 (Jan. 21, 2020), pp. 1-100, XP014360490, 100 pages, Retrieved from the Internet: URL: http://www.etsi.org/deliver/etsi_ts/138200_138299/138211/15.08.00_60/ts_138211v150800p.pdf [retrieved on Jan. 21, 2020] paragraph [7.4.3.1].
(Continued)

*Primary Examiner* — Afshawn M Towfighi
(74) *Attorney, Agent, or Firm* — Holland & Hart LLP

(57) ABSTRACT

Methods, systems, and devices for wireless communications are described. A user equipment (UE) may distinguish between synchronization signal blocks (SSBs) intended for different classes of UEs. For example, a base station may transmit different SSBs in a physical broadcast channel with different configurations or parameters to indicate different UE classes, where UEs may monitor for and receive SSBs for their UE class. A UE may operate according to a UE class (e.g., New Radio (NR) Light) associated with lower bandwidths and may identify SSBs associated with this UE class to connect with a base station. The UE may identify the SSBs associated with the UE class based on a subcarrier-level offset value either implicitly or explicitly indicated to the UE. Additionally, the base station may transmit fields to (Continued)

indicate different parameters for subsequent communications transmitted according to the UE class.

32 Claims, 26 Drawing Sheets

(51) Int. Cl.
  *H04W 72/0446* (2023.01)
  *H04W 76/27* (2018.01)
  *H04W 72/30* (2023.01)
  *H04W 72/53* (2023.01)

(52) U.S. Cl.
  CPC ............ *H04W 72/30* (2023.01); *H04W 72/53* (2023.01); *H04W 76/27* (2018.02)

(58) Field of Classification Search
  CPC ....... H04W 76/27; H04W 8/22; H04W 48/12; H04W 76/20; H04W 76/10; H04W 76/30; H04W 76/40; H04L 27/2602; H04L 27/2666; H04B 1/7143; H04J 11/0073; H04J 11/0076
  See application file for complete search history.

(56) References Cited

U.S. PATENT DOCUMENTS

| | | | | |
|---|---|---|---|---|
| 2019/0239245 | A1* | 8/2019 | Davydov | H04L 5/0048 |
| 2019/0319748 | A1* | 10/2019 | Nam | H04B 7/0413 |
| 2020/0196254 | A1* | 6/2020 | Kerhuel | H04L 5/0048 |
| 2020/0404601 | A1* | 12/2020 | Lin | H04L 1/0061 |
| 2021/0058971 | A1* | 2/2021 | MolavianJazi | H04W 72/23 |
| 2021/0152397 | A1* | 5/2021 | Jiang | H04W 72/0453 |
| 2021/0235426 | A1* | 7/2021 | Xia | H04W 72/23 |
| 2021/0250929 | A1* | 8/2021 | Sakhnini | H04W 48/12 |
| 2022/0167420 | A1* | 5/2022 | Zhang | H04L 5/14 |

OTHER PUBLICATIONS

Alcatel-Lucent, et al., "Coverage Enhancement Techniques for PBCH", 3GPP Draft, 3GPP TSG-RAN WG1 Meeting #74bis, R1-134207—REL-12 MTC—Coverage Enhancement for PBCH V0.2, 3rd Generation Partnership Project (3GPP), Mobile Competence Centre, 650, Route Des Lucioles, F-06921, Sophia-Antipolis Cedex, France, vol. RAN WG1, No. Guangzhou, China, Oct. 7, 2013-Oct. 11, 2013, Sep. 28, 2013 (Sep. 28, 2013), XP050717393, 5 pages, Retrieved from the Internet: URL: http://www.3gpp.org/ftp/tsg_ran/WG1_RL1/TSGR1_74b/Docs/ [retrieved on Sep. 28, 2013] paragraph [02.4]-paragraph [02.5].

International Search Report and Written Opinion—PCT/US2021/019091—ISA/EPO—dated May 6, 2021 (202781WO).

Lenovo: "Consideration of Frequency Hopping for MTC UEs", 3GPP Draft, 3GPP TSG RAN WG1 Meeting #82, R1-154497, 3rd Generation Partnership Project (3GPP), Mobile Competence Centre, 650, Route Des Lucioles, F-06921, Sophia-Antipolis Cedex, France, vol. RAN WG1, No. Beijing, China, Aug. 24, 2015-Aug. 28, 2015, Aug. 23, 2015 (Aug. 23, 2015), XP051001769, 3 pages, Retrieved from the Internet: URL: http://www.3gpp.org/ftp/Meetings_3GPP_SYNC/RAN1/Docs/ [retrieved on Aug. 23, 2015] paragraph [0001]-paragraph [0002].

ZTE: "Discussion on Repetition for Control Channel and Traffic Channel", 3GPP Draft, 3GPP TSG RAN WG1 Meeting #74, R1-133062, 3rd Generation Partnership Project (3GPP), Mobile Competence Centre, 650, Route Des Lucioles, F-06921, Sophia-Antipolis Cedex, France, vol. RAN WG1, No. Barcelona, Spain, Aug. 19, 2013-Aug. 23, 2013, Aug. 10, 2013 (Aug. 10, 2013), XP050716289, 9 pages, Retrieved from the Internet: URL: http://www.3gpp.org/ftp/tsg_ran/WG1_RL1/TSGR1_74/Docs/ [retrieved on Aug. 10, 2013] paragraph [0001] paragraph [02 .1].

\* cited by examiner

PHYSICAL BROADCAST CHANNEL ENHANCEMENT FOR NEW RADIO LIGHT COMMUNICATIONS

CROSS REFERENCE

The present Application for Patent claims the benefit of U.S. Provisional Patent Application No. 62/983,522 by LEI et al., entitled "PHYSICAL BROADCAST CHANNEL ENHANCEMENT FOR NEW RADIO LIGHT COMMUNICATIONS," filed Feb. 28, 2020, assigned to the assignee hereof, and expressly incorporated by reference in its entirety herein.

FIELD OF TECHNOLOGY

The following relates generally to wireless communications and more specifically to physical broadcast channel (PBCH) enhancements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support physical broadcast channel enhancement (PBCH) for New Radio (NR) Light communications. Generally, the described techniques provide for distinguishing between synchronization signal blocks (SSBs) intended for different classes of user equipment (UEs). For example, a base station may transmit different SSBs in a PBCH with different configurations or parameters to indicate different UE classes, where UEs may monitor for and receive SSBs for their UE class. As described herein, a UE may operate according to a UE class (e.g., NR Light) associated with lower bandwidths and may identify SSBs associated with this UE class to establish or modify a connection with a base station. In some cases, the UE may identify the SSBs associated with the UE class based on a subcarrier-level offset value ($k_{SSB}$) either implicitly or explicitly indicated to the UE (e.g., via the PBCH). Additionally, the base station may transmit fields in the PBCH to indicate different parameters (e.g., related to repetitions or frequency hopping) for subsequent communications transmitted according to the UE class. The UE may also determine a multiplexing pattern for communications transmitted according to the UE class (e.g., SSBs, control resource sets (CORESETs), system information blocks (SIBs), or the like) based on different subcarrier spacings (SCSs) and bandwidths the base station is using.

A method of method of wireless communication is described. The method may include receiving an SSB at a UE, the SSB including an indication of a UE class supported by the SSB, where the UE class is based on a UE bandwidth, determining, based on the indication, that the UE belongs to the UE class supported by the SSB, and establishing or modifying a connection between the UE and a base station using the SSB based on the determination.

An apparatus for method of wireless communication is described. The apparatus may include a processor, memory coupled with the processor, and instructions stored in the memory. The instructions may be executable by the processor to cause the apparatus to receive an SSB at a UE, the SSB including an indication of a UE class supported by the SSB, where the UE class is based on a UE bandwidth, determine, based on the indication, that the UE belongs to the UE class supported by the SSB, and establish or modifying a connection between the UE and a base station using the SSB based on the determination.

Another apparatus for method of wireless communication is described. The apparatus may include means for receiving an SSB at a UE, the SSB including an indication of a UE class supported by the SSB, where the UE class is based on a UE bandwidth, determining, based on the indication, that the UE belongs to the UE class supported by the SSB, and establishing or modifying a connection between the UE and a base station using the SSB based on the determination.

A non-transitory computer-readable medium storing code for method of wireless communication is described. The code may include instructions executable by a processor to receive an SSB at a UE, the SSB including an indication of a UE class supported by the SSB, where the UE class is based on a UE bandwidth, determine, based on the indication, that the UE belongs to the UE class supported by the SSB, and establish or modifying a connection between the UE and a base station using the SSB based on the determination.

In some examples of the method, apparatuses, and non-transitory computer-readable medium described herein, receiving the SSB may include operations, features, means, or instructions for receiving an indication of a subcarrier offset between the SSB and a carrier resource block grid, where establishing or modifying the connection between the UE and the base station may be based on the subcarrier offset.

In some examples of the method, apparatuses, and non-transitory computer-readable medium described herein, the indication of the UE class supported by the SSB may be based on a range within which the subcarrier offset falls.

In some examples of the method, apparatuses, and non-transitory computer-readable medium described herein, the indication of the subcarrier offset may be based on a combination of a first set of one or more bits in a first field of the SSB and a second set of one or more bits in a second field of the SSB.

Some examples of the method, apparatuses, and non-transitory computer-readable medium described herein may further include operations, features, means, or instructions for determining a valid range of the subcarrier offset based on the UE class supported by the SSB, where establishing or modifying the connection between the UE and the base station may be further based on the subcarrier offset in the SSB falling within the valid range.

In some examples of the method, apparatuses, and non-transitory computer-readable medium described herein, the receiving the SSB may include operations, features, means, or instructions for receiving one or more bits explicitly indicating the UE class supported by the SSB.

Some examples of the method, apparatuses, and non-transitory computer-readable medium described herein may further include operations, features, means, or instructions for receiving repetition information for a broadcast channel from the base station, where the repetition information may be based on the UE class supported by the SSB.

In some examples of the method, apparatuses, and non-transitory computer-readable medium described herein, the repetition information may include operations, features, means, or instructions for an indication of support for intra-slot repetition over the broadcast channel, an indication of support for inter-slot repetition over the broadcast channel, or a combination thereof.

In some examples of the method, apparatuses, and non-transitory computer-readable medium described herein, the repetition information includes an indication of a number of transmission repetitions configured for the broadcast channel.

In some examples of the method, apparatuses, and non-transitory computer-readable medium described herein, the frequency hopping information is received in one or more of a master information block (MIB), a physical layer payload of the broadcast channel, a demodulation reference signal (DMRS) scrambling identifier of the broadcast channel, or any combination thereof.

In some examples of the method, apparatuses, and non-transitory computer-readable medium described herein, the repetition information is received in one or more of a MIB, a physical layer payload of the broadcast channel, a DMRS scrambling identifier of the broadcast channel, or any combination thereof.

Some examples of the method, apparatuses, and non-transitory computer-readable medium described herein may further include operations, features, means, or instructions for receiving frequency hopping information for a broadcast channel from the base station, where the frequency hopping information may be based on the UE class supported by the SSB.

In some examples of the method, apparatuses, and non-transitory computer-readable medium described herein, the frequency hopping information may include operations, features, means, or instructions for an indication of support for intra-slot frequency hopping over the broadcast channel, an indication of support for inter-slot frequency hopping over the broadcast channel, or a combination thereof.

Some examples of the method, apparatuses, and non-transitory computer-readable medium described herein may further include operations, features, means, or instructions for determining, based on the UE class supported by the SSB, a multiplexing pattern for the SSB, a CORESET for broadcast control information, and a SIB.

In some examples of the method, apparatuses, and non-transitory computer-readable medium described herein, determining the multiplexing pattern based on the UE class supported by the SSB may include operations, features, means, or instructions for mapping the multiplexing pattern to a combination of the UE bandwidth, an SCS associated with the SSB, and an SCS of the broadcast control information of the CORESET.

In some examples of the method, apparatuses, and non-transitory computer-readable medium described herein, establishing or modifying the connection may include operations, features, means, or instructions for receiving system information in the SSB and performing, based at least in part on the system information, one or more of: a radio resource control (RRC) connection establishment procedure, an RRC connection reconfiguration procedure, or an RRC release procedure.

A method of method of wireless communication at a base station is described. The method may include transmitting an SSB to a UE, the SSB including an indication of a UE class supported by the SSB, where the UE class is based on a UE bandwidth, determining that the UE belongs to the UE class supported by the SSB, and establishing or modifying a connection between the UE and the base station using the SSB based on the determination.

An apparatus for method of wireless communication at a base station is described. The apparatus may include a processor, memory coupled with the processor, and instructions stored in the memory. The instructions may be executable by the processor to cause the apparatus to transmit an SSB to a UE, the SSB including an indication of a UE class supported by the SSB, where the UE class is based on a UE bandwidth, determine that the UE belongs to the UE class supported by the SSB, and establish or modifying a connection between the UE and the base station using the SSB based on the determination.

Another apparatus for method of wireless communication at a base station is described. The apparatus may include means for transmitting an SSB to a UE, the SSB including an indication of a UE class supported by the SSB, where the UE class is based on a UE bandwidth, determining that the UE belongs to the UE class supported by the SSB, and establishing or modifying a connection between the UE and the base station using the SSB based on the determination.

A non-transitory computer-readable medium storing code for method of wireless communication at a base station is described. The code may include instructions executable by a processor to transmit an SSB to a UE, the SSB including an indication of a UE class supported by the SSB, where the UE class is based on a UE bandwidth, determine that the UE belongs to the UE class supported by the SSB, and establish or modifying a connection between the UE and the base station using the SSB based on the determination.

In some examples of the method, apparatuses, and non-transitory computer-readable medium described herein, transmitting the SSB may include operations, features, means, or instructions for transmitting an indication of a subcarrier offset between the SSB and a carrier resource block grid, where establishing or modifying the connection between the UE and the base station may be based on the subcarrier offset.

In some examples of the method, apparatuses, and non-transitory computer-readable medium described herein, the indication of the UE class supported by the SSB may be based on a range within which the subcarrier offset falls.

In some examples of the method, apparatuses, and non-transitory computer-readable medium described herein, the indication of the subcarrier offset may be based on a combination of a first set of one or more bits in a first field of the SSB and a second set of one or more bits in a second field of the SSB.

Some examples of the method, apparatuses, and non-transitory computer-readable medium described herein may further include operations, features, means, or instructions for determining a valid range of the subcarrier offset based on the UE class supported by the SSB, where establishing or modifying the connection between the UE and the base station may be further based on the subcarrier offset in the SSB falling within the valid range.

In some examples of the method, apparatuses, and non-transitory computer-readable medium described herein, the transmitting the SSB may include operations, features, means, or instructions for transmitting one or more bits explicitly indicating the UE class supported by the SSB.

Some examples of the method, apparatuses, and non-transitory computer-readable medium described herein may further include operations, features, means, or instructions for transmitting repetition information for a broadcast channel to the UE, where the repetition information may be based on the UE class supported by the SSB.

In some examples of the method, apparatuses, and non-transitory computer-readable medium described herein, the repetition information may include operations, features, means, or instructions for an indication of support for intra-slot repetition over the broadcast channel, an indication of support for inter-slot repetition over the broadcast channel, or a combination thereof.

In some examples of the method, apparatuses, and non-transitory computer-readable medium described herein, the repetition information includes an indication of a number of transmission repetitions configured for the broadcast channel.

In some examples of the method, apparatuses, and non-transitory computer-readable medium described herein, the repetition information is received in one or more of a MIB, a physical layer payload of the broadcast channel, a DMRS scrambling identifier of the broadcast channel, or any combination thereof.

Some examples of the method, apparatuses, and non-transitory computer-readable medium described herein may further include operations, features, means, or instructions for transmitting frequency hopping information for a broadcast channel to the UE, where the frequency hopping information may be based on the UE class supported by the SSB.

In some examples of the method, apparatuses, and non-transitory computer-readable medium described herein, the frequency hopping information may include operations, features, means, or instructions for an indication of support for intra-slot frequency hopping over the broadcast channel, an indication of support for inter-slot frequency hopping over the broadcast channel, or a combination thereof.

In some examples of the method, apparatuses, and non-transitory computer-readable medium described herein, the frequency hopping information is received in one or more of a MIB, a physical layer payload of the broadcast channel, a DMRS scrambling identifier of the broadcast channel, or any combination thereof.

Some examples of the method, apparatuses, and non-transitory computer-readable medium described herein may further include operations, features, means, or instructions for determining, based on the UE class supported by the SSB, a multiplexing pattern for the SSB, a CORESET for broadcast control information, and a SIB.

In some examples of the method, apparatuses, and non-transitory computer-readable medium described herein, determining the multiplexing pattern based on the UE class supported by the SSB may include operations, features, means, or instructions for mapping the multiplexing pattern to a combination of the UE bandwidth, an SCS associated with the SSB, and an SCS of the broadcast control information of the CORESET.

In some examples of the method, apparatuses, and non-transitory computer-readable medium described herein, determining that the UE belongs to the UE class may include operations, features, means, or instructions for receiving, from the UE, capability information indicating the UE class.

DETAILED DESCRIPTION

Figure 1:
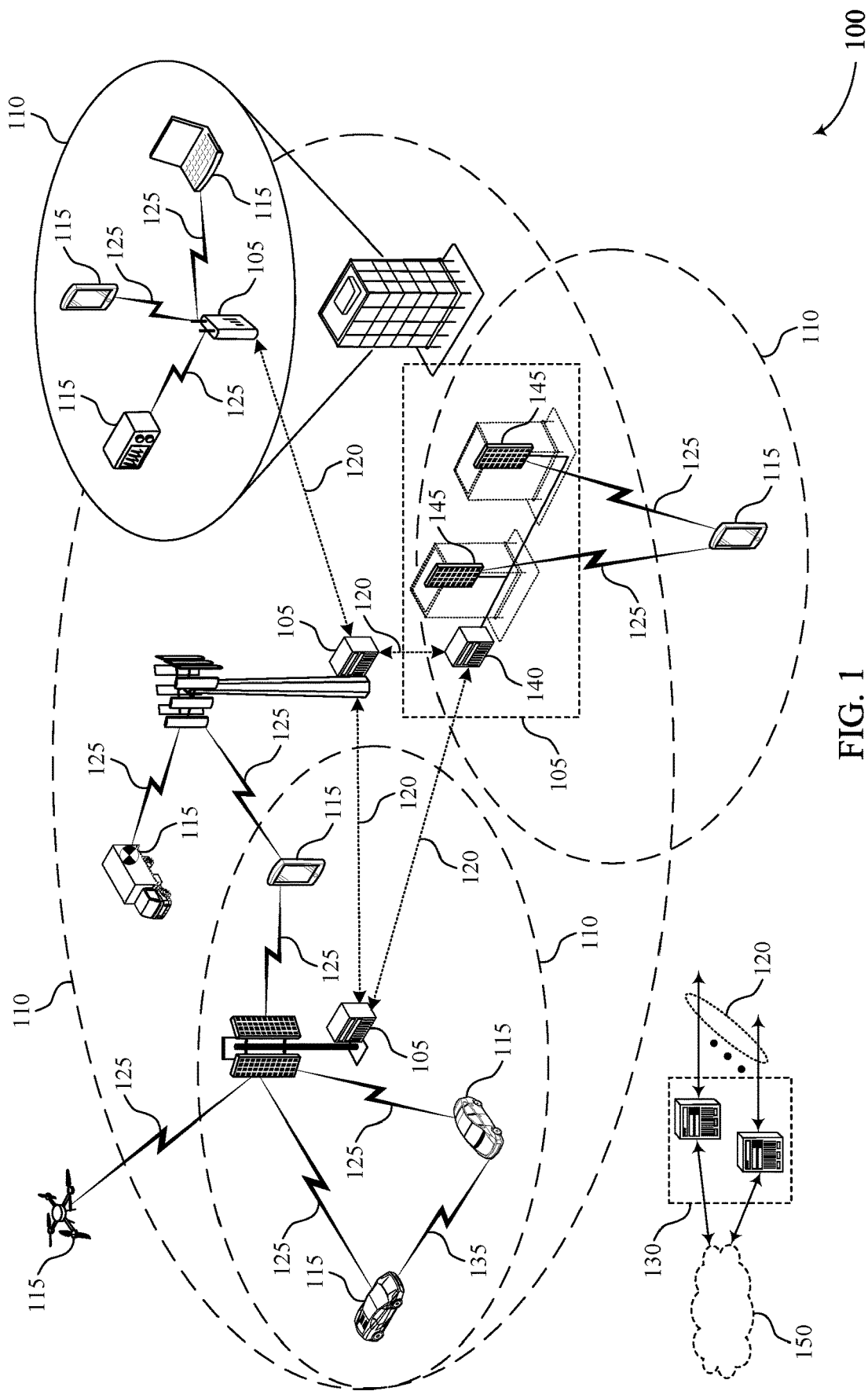
FIGS. 1 and 2 illustrate examples of wireless communications systems that support physical broadcast channel (PBCH) enhancement for New Radio (NR) Light communications in accordance with aspects of the present disclosure.

In some wireless communications systems, communications for New Radio (NR) Light devices may be defined. The NR Light (e.g., NR-Lite) devices may include wearable UEs, industrial wireless sensor networks (IWSNs), surveillance cameras, low-end smartphones, relaxed-Internet of Things (IoT) devices, or the like. Additionally, for NR Light communications, enhanced coverage recovery, relaxed timelines (e.g., 10-30 millisecond (ms) latency), and reduced user equipment (UE) bandwidths (e.g., 1-2 megahertz (MHz)) may be defined that are different than other communications systems for NR (e.g., an NR Light may operate according to different communication standards than ultra-reliable low-latency communications (URLLC), enhanced mobile broadband (eMBB) communications, enhanced machine type communications (eMTC), Long Term Evolution (LTE), or the like). In some cases, NR Light communications may enable different wireless communications to support a single wireless communications system (e.g., an NR network) for different levels of devices. In some cases, a user equipment UE may monitor for and receive a physical broadcast channel (PBCH) from a base station to receive configuration information, synchronization information, and additional information for establishing or modifying a connection with the base station. However, techniques for indicating NR Light support and indicating different parameters for the NR Light communications may be inefficient or absent (e.g., such as a PBCH transmission and the information included in the PBCH and synchronization signal blocks (SSBs) of the PBCH).

As described herein, procedures for PBCH enhancement of NR Light UEs are proposed while maintaining a same transmit chain of SSBs for other types of communications (e.g., NR SSBs). In some cases, a base station may transmit an SSB that is used for NR Light communications, and an NR Light UE may identify the SSB is used for the NR Light communications and may establish (e.g., or modify) a connection with the base station based on identifying the SSB and using associated information in the SSB. For example, the SSB may contain a value that denotes a subcarrier-level offset between an SSB and a carrier resource block (CRB) grid (e.g., a $k_{SSB}$ value), where the value of the subcarrier-level offset indicates the SSB is used for NR Light communications based on being outside of a valid range for different frequency bands. That is, a first frequency range (e.g., FR1) may have valid $k_{SSB}$ values in a first range (e.g., from 0 to 23 ([0, 23])), and a second frequency range (e.g., FR2) may have valid $k_{SSB}$ values in a second range (e.g., from 0 to 11 ([0, 11])), such that if the $k_{SSB}$ value in the SSB is outside of these ranges for a respective frequency range, the UE may identify that the SSB includes configuration information to be used for the NR Light communications. In some cases, the $k_{SSB}$ values indicative of the NR Light communications may be a range of values outside of $k_{SSB}$ values used for cell-defining SSBs (e.g., such that if the UE identifies a $k_{SSB}$ value in that range of values, the UE may determine that the SSB is for NR Light) or may be an explicitly indicated value (e.g., a specific $k_{SSB}$ value in an SSB to indicate NR Light communications).

Additionally, the base station may add different information elements or fields in a PBCH to indicate different parameters for the NR Light communications. For example, the base station may add fields to the PBCH to indicate intra-slot or inter-slot repetitions, intra-slot or inter-slot frequency hopping, or both for broadcasting physical downlink control channels (PDCCHs), physical downlink shared channels (PDSCHs), demodulation reference signals (DMRSs), etc. In some cases, the new fields may indicate whether inter-slot or intra-slot repetitions or frequency hopping is enabled, a level of repetitions enabled (e.g., numerical value of repetitions), or both. These new fields may be mapped to unused, reserved, or re-purposed portions of the PBCH, a master information block (MIB) transport block (TB), a physical payload of the PBCH, a DMRS scrambling identifier (ID) of the PBCH, etc. Additionally, the base station may indicate a multiplexing pattern (e.g., time division multiplexing (TDM) pattern, frequency division multiplexing (FDM) pattern, hybrid pattern, or the like) for the NR Light communications based on the SSB. For example, the UE may determine a multiplexing pattern for the NR Light communications based on a bandwidth for the UE (e.g., configured by the base station), a subcarrier spacing (SCS) for the SSB, and an SCS of downlink messages from the base station (the PBCH, a Type0-PDCCH, etc.).

Aspects of the disclosure are initially described in the context of wireless communications systems. Additionally, aspects of the disclosure are illustrated through an additional wireless communications system, resource block (RB) and SSB configurations, flowcharts, offset values, an information field decision tree, TDM patterns, FDM patterns, hybrid multiplexing patterns, and a process flow. Aspects of the disclosure are further illustrated by and described with reference to apparatus diagrams, system diagrams, and flowcharts that relate to PBCH enhancement for NR Light communications.

FIG. 1 illustrates an example of a wireless communications system 100 that supports PBCH enhancement for NR Light communications in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of TDM techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or RBs) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support URLLC or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS, SSS, and the like) using multiple beams in a beam-sweeping manner through a cell coverage area 110. In some cases, PSS, SSS, broadcast information (e.g., a PBCH), or a combination thereof may be transmitted within different synchronization signal (SS) blocks (e.g., SSBs) on respective directional beams, where one or more SS blocks may be included within an SS burst.

After receiving the PSS and SSS, the UE 115 may receive a MIB, which may be transmitted in the PBCH. The MIB may contain system bandwidth information, an SFN, and a physical HARQ indicator channel (PHICH) configuration. After decoding the MIB, the UE 115 may receive one or more SIBs. For example, a first SIB (SIB1) may contain cell access parameters and scheduling information for other SIBs. Decoding SIB1 may enable the UE 115 to receive a second SIB (SIB2). SIB2 may contain RRC configuration information related to random access channel (RACH) procedures, paging, physical uplink control channel (PUCCH), physical uplink shared channel (PUSCH), power control, sounding reference signal (SRS), and cell barring.

After completing initial cell synchronization, a UE 115 may decode the MIB, SIB1, and SIB2 prior to accessing the network. The MIB may be transmitted on a PBCH and may utilize the first 4 OFDMA symbols of the second slot of the first subframe of each radio frame. The MIB may use the middle 6 RBs (72 subcarriers) in the frequency domain. The MIB may carry information for UE initial access, including downlink channel bandwidth in terms of RBs, PHICH configuration (duration and resource assignment), and SFN. A new MIB may be broadcast every fourth radio frame (SFN mod 4=0) and rebroadcast every frame (10 ms). Each repetition may be scrambled with a different scrambling code.

After reading a MIB (either a new version or a copy), the UE 115 may try different phases of a scrambling code until the UE 115 gets a successful CRC check. The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase. After receiving the MIB, a UE may receive one or more SIBs. Different SIBs may be defined according to the type of system information conveyed. A new SIB1 may be transmitted in the fifth subframe of every eighth frame (SFN mod 8=0) and rebroadcasted every other frame (20 ms). SIB1 may include access information, including cell identity information, and may indicate whether a UE 115 may camp on a cell. SIB1 may also include cell selection information, such as cell selection parameters. Additionally, SIB1 may include scheduling information for other SIBs. SIB2 may be scheduled dynamically according to information in SIB1 and includes access information and parameters related to common and shared channels. The periodicity of SIB2 may be set to 8, 16, 32, 64, 128, 256 or 512 radio frames.

After the UE 115 decodes SIB2, the UE 115 may transmit a RACH preamble to a base station 105. For example, the UE 115 or the base station 105 may randomly select the RACH preamble from a set of 64 predetermined sequences. This may enable the base station 105 to distinguish between multiple UEs 115 trying to access the system simultaneously. The base station 105 may respond with a random access response that provides an uplink resource grant, a timing advance, and a temporary cell-radio network temporary identifier (C-RNTI). The UE 115 may then transmit an RRC connection request along with a temporary mobile subscriber identity (TMSI) (e.g., if the UE 115 has previously been connected to the same wireless network) or a random identifier. The RRC connection request may also indicate the reason the UE 115 is connecting to the network (e.g., emergency, signaling, data exchange, or the like). The base station 105 may respond to the connection request with a contention resolution message addressed to the UE 115, which may provide a new C-RNTI. If the UE 115 receives a contention resolution message with the correct identification, the UE 115 may proceed with RRC setup. If the UE 115 does not receive a contention resolution message (e.g., if there is a conflict with another UE 115) the UE 115 may repeat the RACH process by transmitting a new RACH preamble. Such exchange of messages between the UE 115 and base station 105 for random access may be referred to as a four-step RACH procedure.

In some cases, minimum system information (MSI) may be mapped to three parts of a PBCH. For example, the MSI may include a set of bits (e.g., 35 bits) a wireless device (e.g., a UE 115) may use for connecting to a base station 105 transmitting the PBCH. The three parts of the PBCH may include the MIB, a physical layer (PHY) payload, and a DMRS scrambling ID. For the MIB, a first subset of the set of bits (e.g., 24 bits of the 35 bits) may be mapped to different portions of the MIB (e.g., systemFrameNumber, subCarrierSpacingCommon, ssb-SubcarrierOffset, dmrs-TypeA-Position, pdcch-ConfigSIB1, cellBarred, intraFreReselection, spare, or the like). For the PHY payload, a second subset of the set of bits (e.g., eight (8) bits of the 35 bits) may be mapped to different portions of the PHY payload (e.g., four (4) least significant bits (LSBs) of the SFN, half frame index, a most significant bit (MSB) of subcarrier offset, an MSB of SSB block index, or the like). For the DMRS scrambling ID, a third subset of the set of bits (e.g., 3 bits of the 35 bits) may be mapped to a portion of the DMRS scrambling ID (e.g., LSB of SSB index).

Table 1 below may show different numbers of reserved bits currently allocated to the different parts of the PBCH based on respective use cases. The use cases may include communications in frequency range 1 (FR1), frequency range 2 (FR2), unlicensed frequency bands for NR communications (e.g., NR unlicensed (NR-U) frequency bands, such as frequency bands below 6 GHz (sub6)), etc.

TABLE 1

Reserved Bits in PBCH

| Use Case | Number of Reserved Bits in MIB | Number of Reserved Bits in PHY Load of PBCH | Total |
| --- | --- | --- | --- |
| FR1 | 1 | 2 | 3 |
| FR2 | 1 | 0 | 1 |
| NR-U (sub6) | 0 | 1 | 1 |

As shown, different bits in the different parts of the PBCH (e.g., MIB, PHY load/payload, or the like) may be reserved that can be used for other potential signaling in the PBCH.

In some wireless communications systems, different types of UEs 115 (e.g., premium smartphones for eMBB communications, other vertical type UEs 115 for URLLC, V2X, or the like) may have different regulations and operational parameters. However, the wireless communications system may benefit from NR being scalable and deployable in a more efficient and cost-effective way. For example, peak throughput, latency requirements, reliability requirements, or a combination thereof may be relaxed, and efficiency (e.g., power consumption, system overhead, or the like) and cost improvements may be desired. Accordingly, a different type of communications may be defined for other UEs 115 that were not covered before. These other UEs 115 may use NR Light communications (e.g., a UE capability/category) and may be referred to as NR Light UEs 115 that have higher coverage recovery, relaxed timelines (e.g., 5-10 ms latency), and reduced UE bandwidths. For example, the NR Light UEs 115 may include wearables (e.g., smart watches), IWSN, surveillance cameras, low-end smartphones, or the like.

Additionally, for some wireless communications systems, a minimum channel bandwidth (e.g., on a single component carrier) may be related to the frequency bands (e.g., FR1 or FR2) as well as an SCS of an SS or PBCH (e.g., an SSB) and a type-0 PDCCH (e.g., ($SCS_{SSB}$ and $SCS_{PDCCH}$). For example, for FR1, the minimum channel bandwidth for an $SCS_{SSB}$ of 15/30 kHz may be given by 5/10 MHz, respectively. In order to adapt to reduced capabilities of NR Light UEs 115, new system information elements/blocks may be configured to support coverage recovery, relaxed timeline, and reduced UE bandwidth associated with the NR Light UEs 115. Additionally, some of the information elements belonging to MIBs and SIBs may no longer be useful or valid for NR Light (e.g., system information (SI) for previous wireless communications designed for previous NR systems can be simplified, removed, or re-purposed to reduce signaling overhead for NR Light). For co-existence of NR Light UEs 115 and other UEs 115, same or similar PSS and SSS designs may be used with a same bandwidth and transmit chain of the PBCH for any UE 115 to monitor for and receive.

As described herein, wireless communications system 100 may support PBCH enhancement strategies for NR Light UEs 115 without changing a transmit chain for SSBs in the PBCH. For example, PBCH type differentiation (e.g., whether different transmissions in the PBCH are intended for NR Light communications or other types of communications, such as eMBB, URLLC, or the like) may be supported based on range differentiation of subcarrier-level offset values (e.g., $k_{SSB}$) or reserved bits of the PBCH. Additionally, reserved or unused bits in the PBCH may be re-purposed (e.g., in a MIB, a PHY payload of the PBCH, or both) to carry information elements for different UE capabilities as part of the NR Light communications, and different adaptive multiplexing patterns may be specified for the NR Light UEs 115 for SSBs (e.g., SS or PBCH), for type0-PDCCH common search space (CSS) sets (e.g., CORESET0), for a SIB1 in the PBCH, or a combination thereof.

Figure 2:
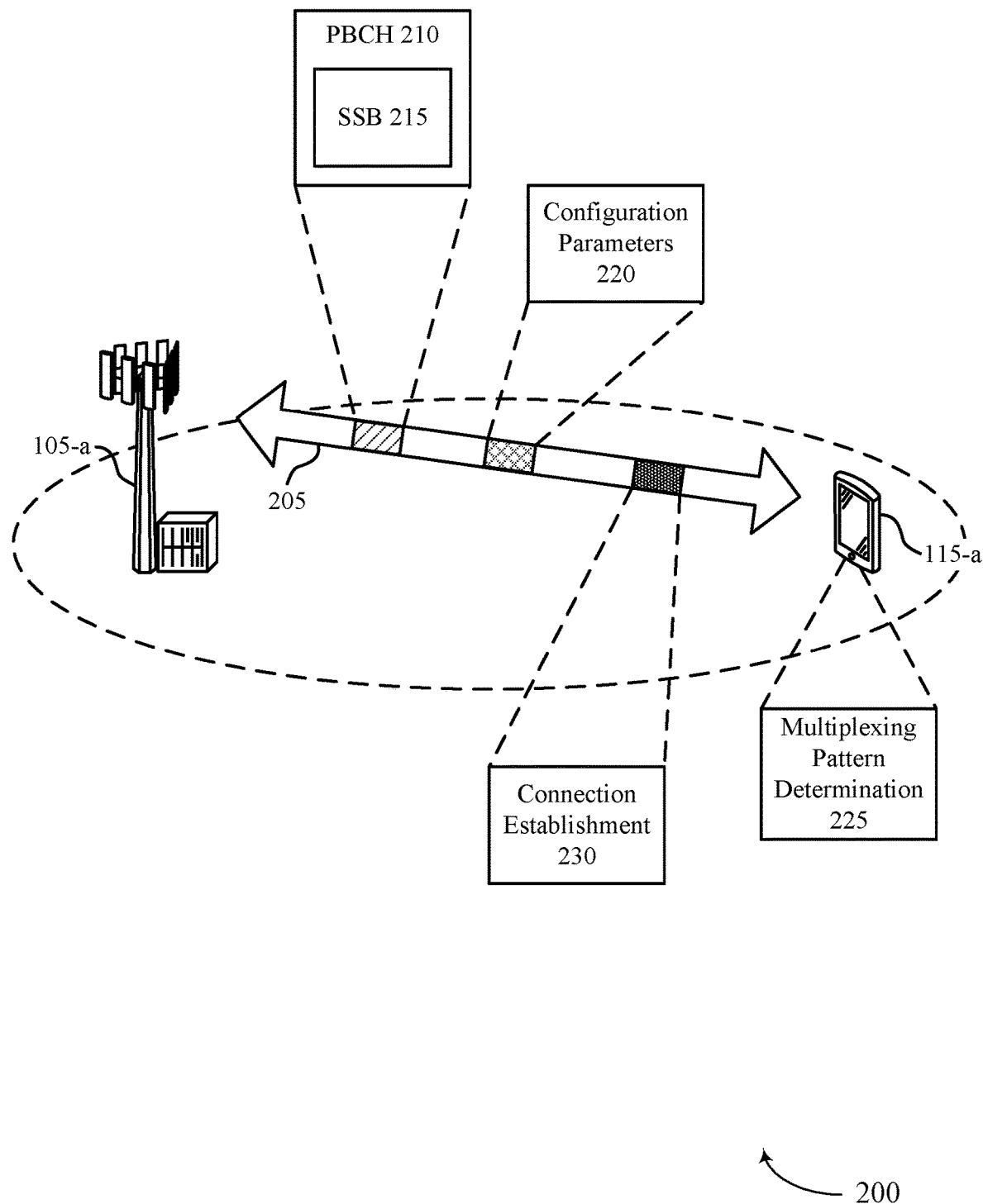

FIG. 2 illustrates an example of a wireless communications system 200 that supports PBCH enhancement for NR Light communications in accordance with aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115, respectively, as described with reference to FIG. 1. In some cases, base station 105-a and UE 115-a may communicate using resources (e.g., time and frequency resources) of a carrier 205.

As described herein, UE 115-a may be an NR Light device (e.g., a UE class) that uses lower bandwidths than other UEs 115 (e.g., with relaxed timelines or latency and enhanced coverage recovery). The UE class may be based on one or more types of communications UE 115-a supports, such as NR Light communications. Accordingly, NR Light devices may operate according to different system parameters for a PBCH 210 (e.g., broadcasted or otherwise transmitted on the resources of carrier 205) to synchronize and connect to an NR network (e.g., via base station 105-a) when compared with other UEs 115 (e.g., standard UEs 115). However, a separate SSB for NR Light communications may not be defined, nor may there be a way for UE 115-a (e.g., and other NR Light devices) to distinguish between an SSB intended for NR Light devices and an SSB intended for wider band UEs 115.

In some wireless communications systems, $k_{SSB}$ may denote a subcarrier-level offset between an SSB and a CRB grid, where a valid range of $k_{SSB}$ for a cell-defining SSB is [0, 23] for FR1 and [0, 11] for FR2. If a UE 115 detects a first SSB and determines the $k_{SSB}$ value of the first SSB is beyond the valid range of cell-defining SSBs, the UE 115 may assume a CORESET (e.g., a CORESET0) is not configured for the first SSB. Additionally or alternatively, a different mapping procedure for $k_{SSB}$ may be used for NR Light devices without impacting behaviors of other UEs 115 not operating according to, or using, NR Light communications. In some cases, NR Light devices (e.g., UE 115-a) may use SSBs configured for other wireless communications systems for reference signal measurements, and the other UEs 115 (e.g., eMBB UEs 115, URLLC UEs 115, or the like) may use SSBs configured for NR Light for reference signal measurements.

As described herein, base station 105-a and UE 115-a may use a different mapping procedure for $k_{SSB}$ to identify whether an SSB 215 transmitted in PBCH 210 is intended for NR Light communications or not. For example, base station 105-a may map values of $k_{SSB}$ for NR Light communications (e.g., $k_{SSB, NR-light}$) to a range non-overlapping with a range of $k_{SSB}$ values for cell-defining SSBs used for other wireless communications systems (e.g., an implicit indication). Additionally or alternatively, base station 105-a may indicate a PBCH type differentiation based on reserved bit(s) in a MIB or PHY payload of PBCH 210. That is, base station 105-a may explicitly indicate if SSB 215 is intended for NR Light communications based on using reserved bit(s) in different portions of PBCH 210.

Additionally, to indicate different UE capabilities for the NR Light communications, base station 105-a may transmit one or more configuration parameters 220 to UE 115-a (e.g., in PBCH 210). For example, base station 105-a may add information elements and fields to PBCH 210 to support coverage enhancement for broadcasting different downlink messages (e.g., PDCCH, PDSCH, DMRS, or the like) to UE 115-a. In some cases, base station 105-a may add fields in PBCH 210 to indicate support of intra-slot or inter-slot repetitions, intra-slot or inter-slot frequency hopping for broadcasting the different downlink messages. The added fields may be mapped to a subset of unused, reserve, or re-purposed information bits carried by PBCH 210 (e.g., including a MIB TB, a PHY payload of PBCH 210, a DMRS scrambling ID of PBCH 210, or a combination thereof).

In some cases, UE 115-a may also perform a multiplexing pattern determination 225 to determine a multiplexing pattern that base station 105-a is using for transmitting downlink messages to UE 115-a (e.g., PBCH 210, SSB 215, CSS sets in PBCH 210, SIB1 in PBCH 210, or a combination thereof). For example, the multiplexing patterns used by base station 105-a may be dependent upon a bandwidth and SCS configured by base station 105-a. Some wireless communications systems may support different multiplexing patterns based on a frequency range (e.g., FR1 supports TDM patterns, FR2 supports TDM, FDM, and hybrid patterns for the multiplexing of SSBs, CSS sets, SIBs, or a combination thereof). Depending on the bandwidth, $SCS_{SSB}$ (e.g., SCS for SSB 215) and $SCS_{Type0-PDCCH}$ (e.g., SCS for a Type0-PDCCH or CORESET) of UE 115-a (e.g., NR Light device or UE 115), different multiplexing patterns (e.g., TDM, FDM, hybrid of TDM and FDM, or a combination thereof) may be configured for the NR Light communications (e.g., in both FR1 and FR2). To accommodate different multiplexing patterns and repetition-based transmissions for broadcasting the downlink messages for the NR Light communications, look-up tables may be defined and used for default configurations of CORESET0 and Type0-PDCCH monitoring occasions, where the look-up tables may be parameterized based on the combinations of the bandwidth, $SCS_{SSB}$, and $SCS_{Type0-PDCCH}$.

Subsequently, based on identifying that SSB 215 is intended for NR Light communications, using configuration parameters 220, and multiplexing pattern determination 225, UE 115-a and base station 105-a may perform a connection establishment 230 to begin NR Light communications. For example, connection establishment 230 may include a RACH procedure to establish an RRC connection between UE 115-a and base station 105-a. Additionally or alternatively, connection establishment 230 may include a reestablishment procedure or a similar procedure to modify a current established connection between UE 115-a and base station 105-a based on the NR Light communications.

Figure 3A:
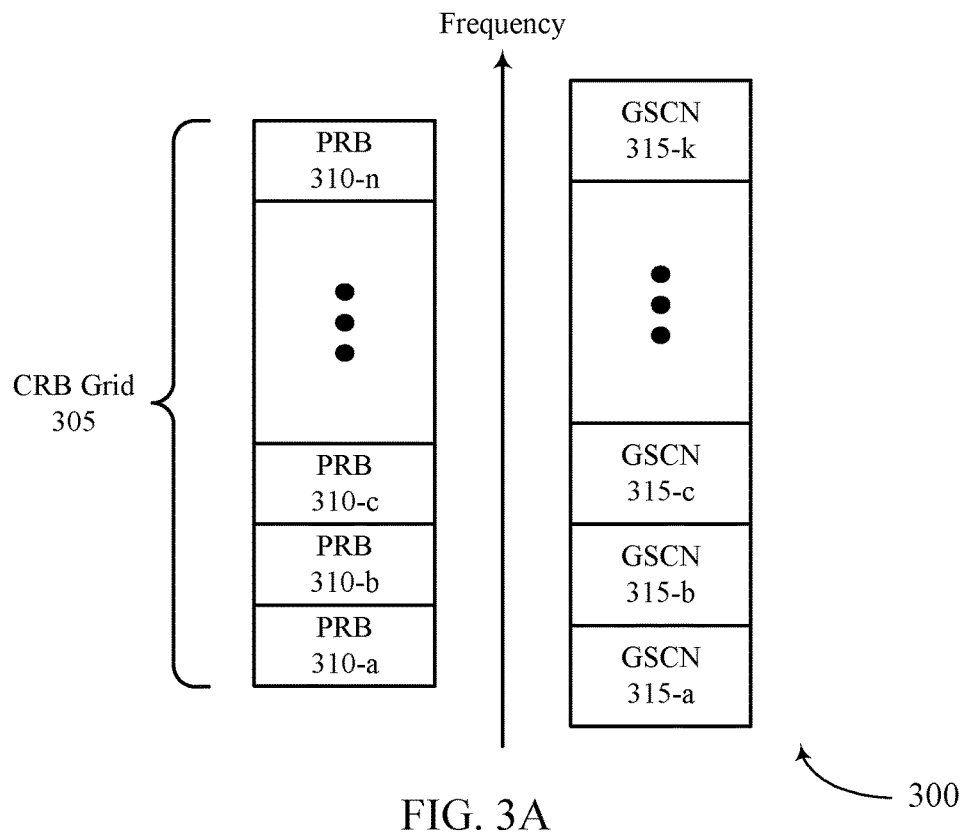
FIGS. 3A and 3B illustrate examples of resource and synchronization block configurations that support PBCH enhancement for NR Light communications in accordance with aspects of the present disclosure.
Figure 3B:
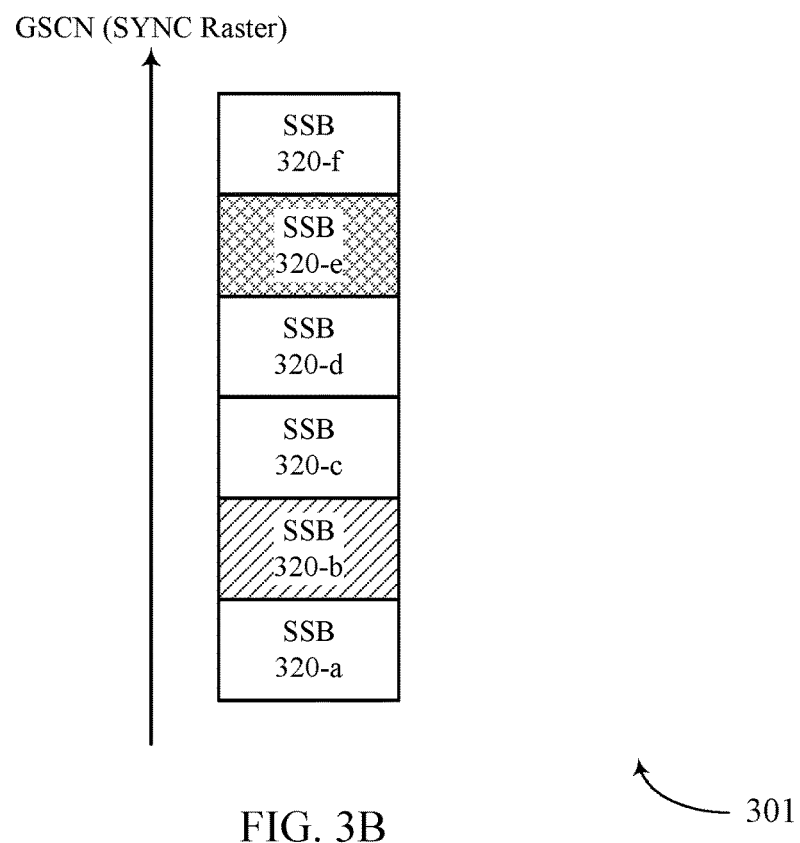

FIGS. 3A and 3B illustrate examples of an RB configuration 300 and an SSB configuration 301, respectively, that support PBCH enhancement for NR Light communications in accordance with aspects of the present disclosure. In some examples, RB configuration 300 and SSB configuration 301 may implement aspects of wireless communications systems 100 and wireless communications system 200. In some cases, a UE 115 may use RB configuration 300 and SSB configuration 301 to identify control and synchronization information for connecting to a base station 105.

RB configuration 300 may include a CRB grid 305 that includes N physical RBs (PRBs) 310, ranging from PRB 310-*a* to an N-th PRB 310-*n* that increase in frequency. The CRB grid 305 may be located at a reference location in the frequency domain, such that the base station 105 transmits the CRB grid 305 at this same reference location for any given time (e.g., in a PBCH). Additionally, RB configuration 300 may include one or more global sync channel numbers (GSCNs) 315, ranging from a first GSCN 315-*a* to a K-th GSCN 315-*k*. In some cases, each GSCN 315 may correspond to a candidate frequency domain location for a center of an SSB. Due to different SCSs used by the CRB grid 305 and SSBs (e.g., indicated by the GSCNs 315) as well as a synchronization (SYNC) raster definition (e.g., frequency positions of SSBs that can be used by the UE 115 for system acquisition), the PRB index of the SSBs may not be necessarily aligned with the PRB index of the CRB grid 305.

SSB configuration 301 may include one or more SSBs 320 (e.g., as shown, ranging from SSB 320-*a* to SSB 320-*f*) that are positioned according to the GSCNs 315 as described with reference to RB configuration 300. The frequency domain position of the SSBs 320 with respect to the CRB grid 305 may be denoted by a sum of $N_{CRB}^{SSB}$ PRBs (e.g., the number of PRBs 310 and the number of SSBs 320) and $k_{SSB}$ subcarriers, where $k_{SSB}$ is indicated in a PBCH from the base station 105. As noted above in FIG. 2, $k_{SSB}$ may indicate a subcarrier-level offset value between the SSBs 320 and the CRB grid 305. Since the CRB grid 305 is transmitted at a same reference location, the locations of the SSBs 320 may be indicated via an offset from that same reference location, enabling the UE 115 to monitor for and receive appropriate SSBs 320 from the base station 105.

The SSB subcarrier offsets ($k_{SSB}$) may enable the UE 115 to perform procedures for monitoring Type0-PDCCH CSS sets. Additionally, not all SSBs 320 transmitted by the base station 105 may be cell-defining SSBs (CD-SSBs). For example, SSB 320-*b* may be a non-cell-defining SSB without a CORESET0, and SSB 320-*e* may be a cell-defining SSB with CORESET0. The UE 115 may identify whether an SSB 320 is a cell-defining SSB based on if a $k_{SSB}$ for that corresponding SSB 320 is within a valid range of $k_{SSB}$ values for cell-defining SSBs (e.g., as described with reference to FIG. 2). Accordingly, as described herein, the UE 115 may identify whether an SSB 320 is a cell-defining SSB for different UE classes or types of communications, such as NR Light, based on the $k_{SSB}$ value for the SSB 320.

Figure 4:
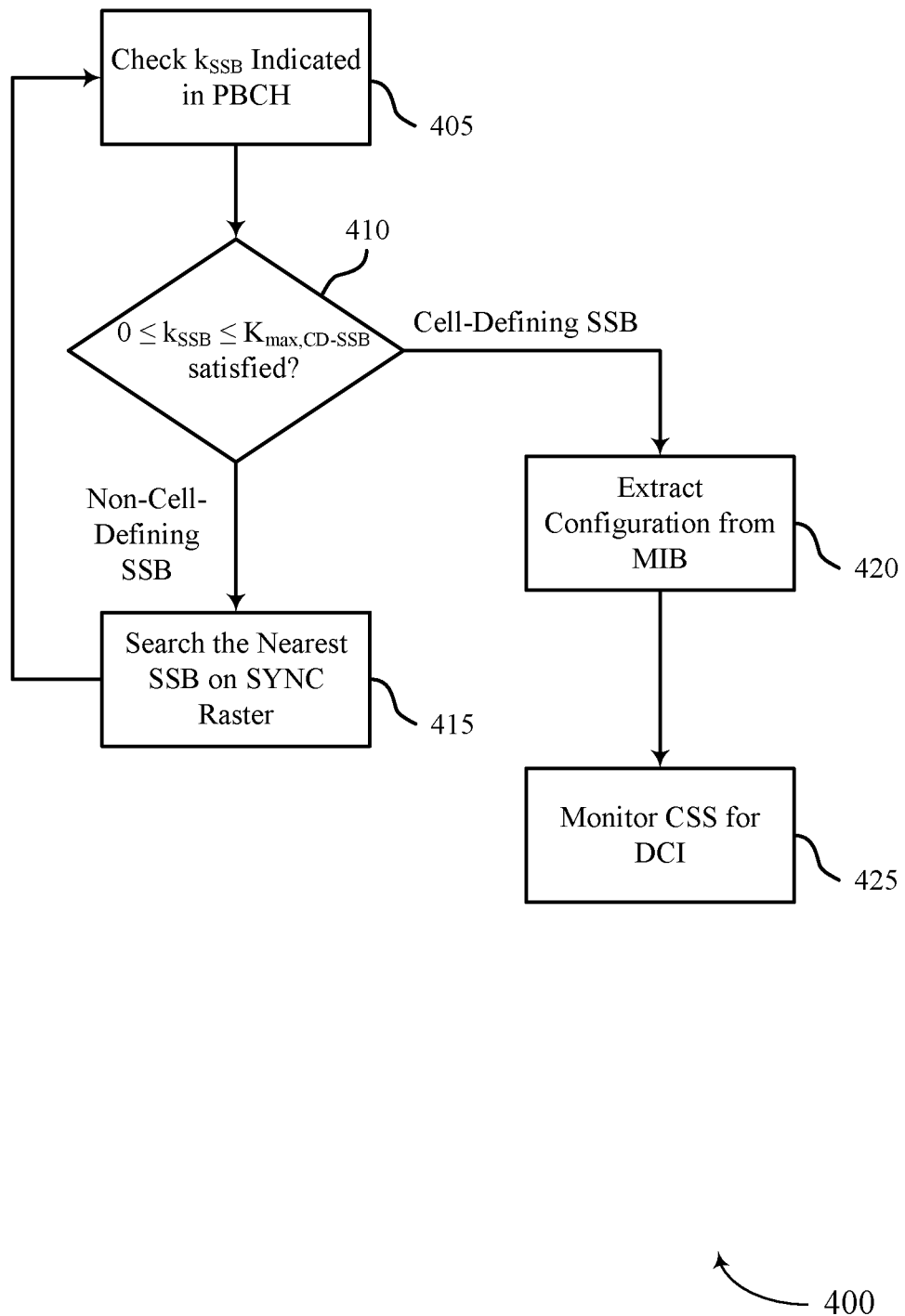
FIG. 4 illustrates an example of a flowchart that supports PBCH enhancement for NR Light communications in accordance with aspects of the present disclosure.

FIG. 4 illustrates an example of a flowchart 400 that supports PBCH enhancement for NR Light communications in accordance with aspects of the present disclosure. In some examples, flowchart 400 may implement aspects of wireless communications systems 100 and wireless communications system 200. Flowchart 400 may include UE procedures for differentiating CD-SSBs and non-CD-SSBs. For example, a UE 115 may receive one or more SSBs from a base station 105 in a PBCH and may determine whether each SSB is a CD-SSB (e.g., to be used for cell acquisition and synchronization for communications with base station 105) or is a non-CD-SSB (e.g., which may be used for reference signal measurements and reports by the UE 115).

At 405, the UE 115 may check a $k_{SSB}$ value indicated in the PBCH for an SSB. At 410, the UE 115 may determine whether the $k_{SSB}$ value is within a valid range for $k_{SSB}$ values that are defined for CD-SSBs. For example, the UE 115 may check whether the $k_{SSB}$ value satisfies the inequality $0 \leq k_{SSB} \leq K_{max,\ CD\text{-}SSB}$, where $K_{max,\ CD\text{-}SSB}$ is a maximum value for the valid range of the $k_{SSB}$ values defined for CD-SSBs.

At 415, if the UE 115 determines the SSB is a non-CD-SSB based on the $k_{SSB}$ value falling outside of the inequality (e.g., the $k_{SSB}$ value is greater than $K_{max,\ CD\text{-}SSB}$), the UE 115 may search for a nearest SSB to the last checked SSB on a SYNC raster (e.g., as shown and described with respect to FIG. 3B). Subsequently, after finding the nearest SSB, the UE 115 may then perform the $k_{SSB}$ value check and inequality satisfaction determination again to determine if this nearest SSB is a CD-SSB or a non-CD-SSB.

Additionally or alternatively, at 420, if the UE 115 determines the SSB is a CD-SSB based on the $k_{SSB}$ value falling within the inequality, the UE 115 may extract configuration information from a MIB (e.g., a pdcch-ConfigSIB1 indication) in the PBCH (e.g., indicated by the SSB). Subsequently, at 425, the UE 115 may monitor a CSS (e.g., Type0 CSS sets) for downlink control information (DCI) from the base station 105 (e.g., a scheduling DCI of SIB1) to obtain further information for establishing or modifying a connection with the base station 105, to receive downlink information from the base station 105, or both.

Figure 5A:
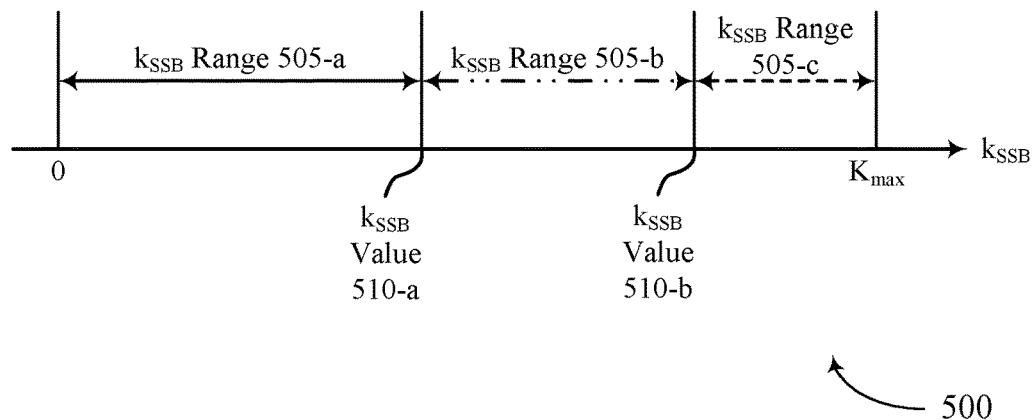
FIGS. 5A and 5B illustrate examples of offset values and a flowchart that support PBCH enhancement for NR Light communications in accordance with aspects of the present disclosure.
Figure 5B:
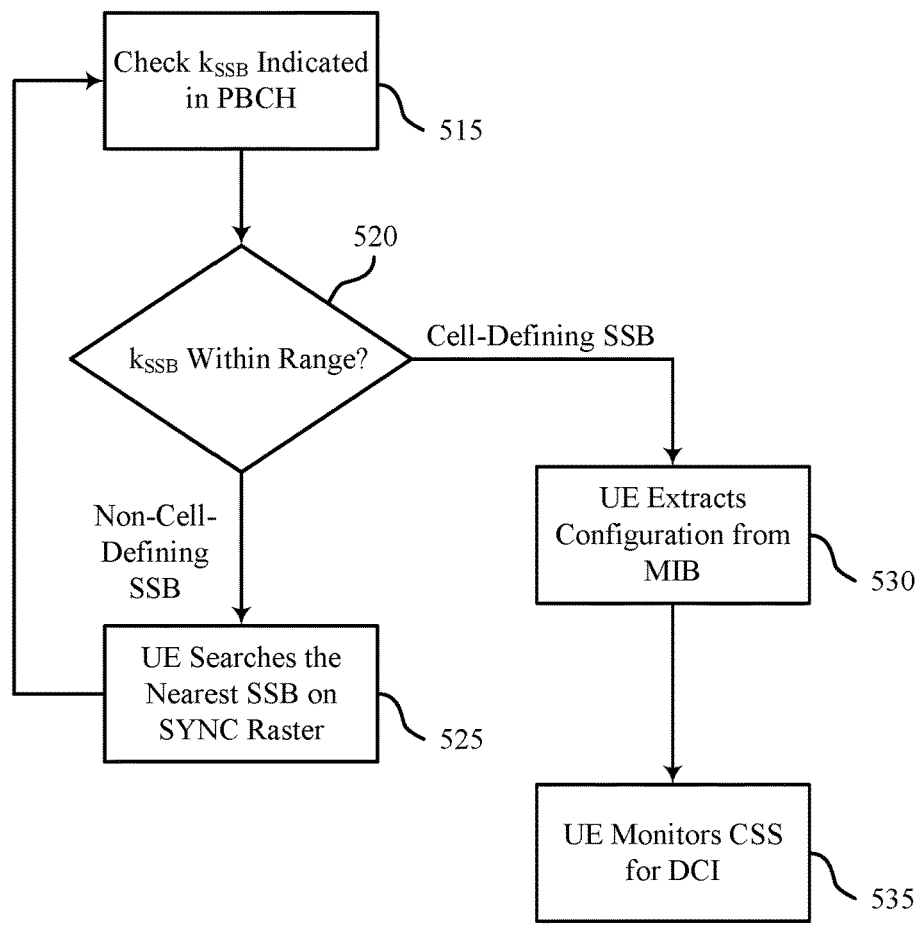

FIGS. 5A and 5B illustrate examples of offset values 500 and a flowchart 501, respectively, that support PBCH enhancement for NR Light communications in accordance with aspects of the present disclosure. In some examples, offset values 500 and flowchart 501 may implement aspects of wireless communications systems 100 and wireless communications system 200.

As described herein, a base station 105 may configure the offset values 500 for different UE classes or types of communications, such as NR Light, eMBB communications, URLLC, or the like. For example, the base station 105 may map $k_{SSB}$ values for NR Light, such as $k_{SSB,\ NR\text{-}light}$ values, to a range that is non-overlapping with a range of $k_{SSB}$ values for CD-SSBs for other types of communications (e.g., eMBB communications, URLLC, or the like). As shown, $k_{SSB}$ range 505-*a* may be configured for CD-SSBs of a first type of communications and set of UE classes (e.g., eMBB devices, URLLC devices, or the like), $k_{SSB}$ range 505-*b* may be configured for CD-SSBs of a second type of communications and set of UE classes (e.g., NR Light devices), and $k_{SSB}$ range 505-*c* may be configured for non-CD-SSBs for both types of communications and UE classes.

Accordingly, for devices operating in the first type of communications and set of UE classes, $k_{SSB}$ range 505-*b* and $k_{SSB}$ range 505-*c* may correspond to non-CD-SSBs of the first type of communications and set of UE classes. Similarly, for devices operating in the second type of communications and set of UE classes, $k_{SSB}$ range 505-*a* and $k_{SSB}$ range 505-*c* may correspond to non-CD-SSBs of the second type of communications and set of UE classes. The non-CD-SSBs may be used by the corresponding devices for measurements (e.g., reference signal measurements and reports).

Each $k_{SSB}$ range 505 may include a maximum value. For example, $k_{SSB}$ range 505-*a* may include a maximum value as given by $k_{SSB}$ value 510-*a* (e.g., $K_{max}^{CD\text{-}SSB,0}$). Additionally, $k_{SSB}$ range 505-*b* may include a maximum value given by $k_{SSB}$ value 510-*b* that is defined based on $k_{SSB}$ value 510-*a* (e.g., $K_{max}^{CD\text{-}SSB,0} + \Delta_{max}^{NR\text{-}light}$, where the $\Delta$ is configured for the NR Light or the second type of communications). In some cases, $k_{SSB}$ range 505-*b* may include a maximum value given by $K_{max}$.

The bit-width configuration for the field of $k_{SSB}$ may have one or more alternatives. For example, the bit-width configuration may re-use existing designs for $k_{SSB}$ values (e.g., for communications systems, such as eMBB communications, URLLC, or both). Additionally or alternatively, the bit-width configuration may be constructed based on an augmented field for $k_{SSB}$ with a larger bit-width by adding reserved or un-used bits of a PBCH.

Based on the offset values 500, the UE 115 may be able to differentiate SSBs based on the different $k_{SSB}$ ranges 505. For example, the UE 115 may use the flowchart 501 to determine whether an SSB is a CD-SSB or a non-CD-SSB for a type of communication or UE class of which the UE 115 is a part.

If the UE 115 is operating according to the first type of communications or a first set of UE classes as described herein, the UE 115 may determine whether an SSB corresponds to a $k_{SSB}$ value within $k_{SSB}$ range 505-a to detect and receive a CD-SSB. At 515, the UE 115 may check the $k_{SSB}$ value of an SSB as indicated in the PBCH. At 520, the UE 115 may then determine whether the $k_{SSB}$ value of the SSB is within a range of CD-SSBs for the first type of communications or first set of UE classes (e.g., $k_{SSB}$ range 505-a).

At 525, if the UE 115 determines the SSB is a non-CD-SSB for the first type of communications or first set of UE classes based on the $k_{SSB}$ value falling outside of $k_{SSB}$ range 505-a (e.g., within $k_{SSB}$ range 505-b or $k_{SSB}$ range 505-c), the UE 115 may search for a nearest SSB to the last checked SSB on a SYNC raster (e.g., as shown and described with respect to FIGS. 3B and 4). Subsequently, after finding the nearest SSB, the UE 115 may perform the $k_{SSB}$ value check and inequality satisfaction determination again to determine if this nearest SSB is a CD-SSB or a non-CD-SSB for the first type of communications or first set of UE classes.

Additionally or alternatively, at 530, if the UE 115 determines the SSB is a CD-SSB for the first type of communications or first set of UE classes based on the $k_{SSB}$ value falling within $k_{SSB}$ range 505-a, the UE 115 may extract configuration information from a MIB (e.g., a pdcch-ConfigSIB1 indication) in the PBCH (e.g., indicated by the SSB). Subsequently, at 535, the UE 115 may monitor a CSS (e.g., Type0 CSS sets) for downlink control information (DCI) from the base station 105 (e.g., a scheduling DCI of SIB1) to obtain further information for establishing or modifying a connection with the base station 105, to receive downlink information from the base station 105, or both.

If the UE 115 is operating according to the second type of communications or second UE class as described herein (e.g., NR Light communications), the UE 115 may perform similar steps in the flowchart 501. However, when determining whether a $k_{SSB}$ value 510 for an SSB is within a $k_{SSB}$ range 505 for the second type of communications or second UE class to identify whether the SSB is a CD-SSB or a non-CD-SSB, the UE 115 may check whether the $k_{SSB}$ is within $k_{SSB}$ range 505-b (e.g., a CD-SSB) or outside $k_{SSB}$ range 505-b (e.g., within $k_{SSB}$ range 505-a or $k_{SSB}$ range 505-c, indicating a non-CD-SSB). Subsequently, the UE 115 may perform the corresponding operations of the flowchart 501 based on the determination of CD-SSBs and non-CD-SSBs.

Figure 6:
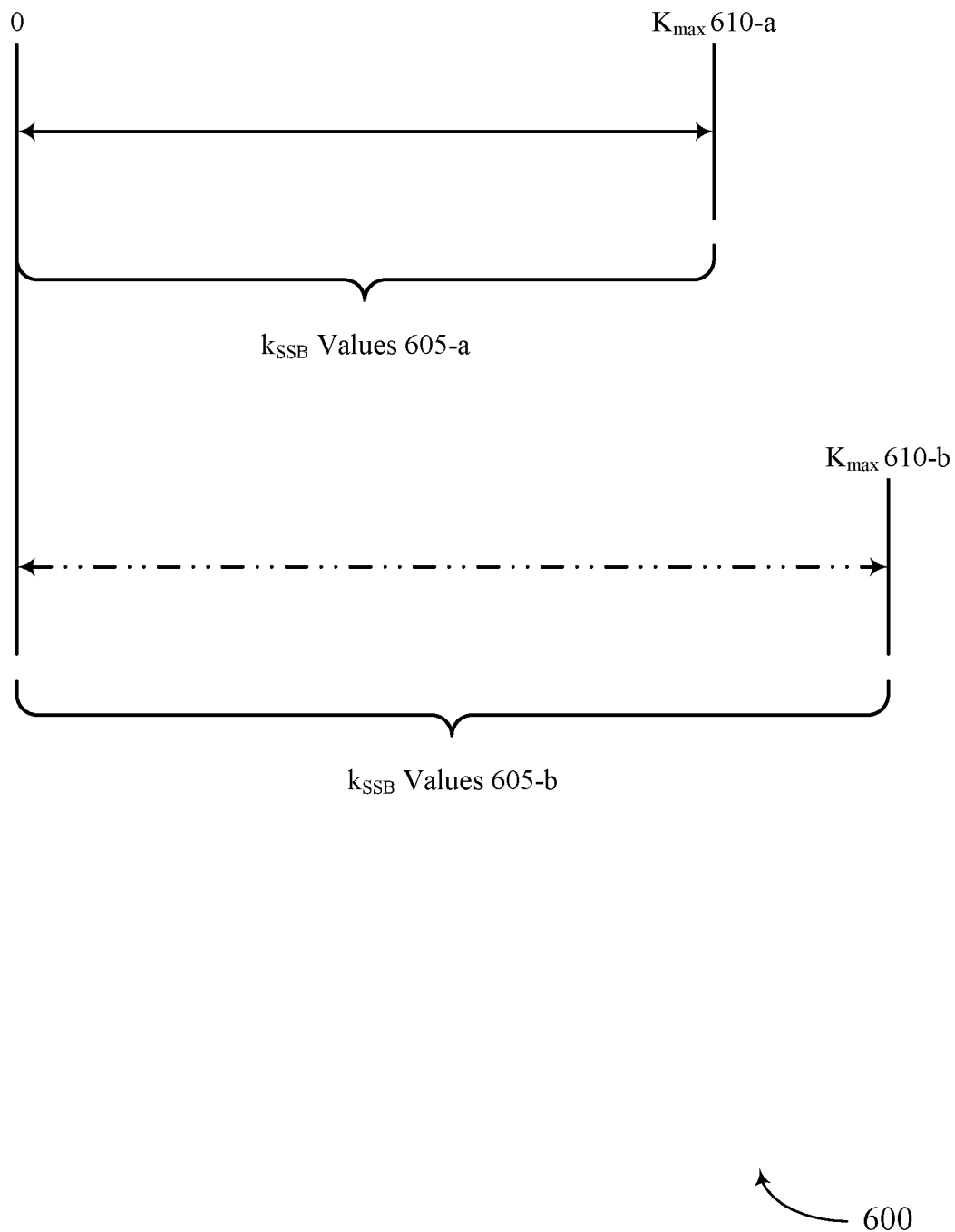
FIG. 6 illustrates an example of offset values that support PBCH enhancement for NR Light communications in accordance with aspects of the present disclosure.

FIG. 6 illustrates an example of offset values 600 that supports PBCH enhancement for NR Light communications in accordance with aspects of the present disclosure. In some examples, offset values 600 may implement aspects of wireless communications systems 100 and wireless communications system 200. As described herein, a base station 105 may configure the offset values 600 for different UE classes or types of communications, such as NR Light, eMBB communications, URLLC, or the like. In some examples, the base station 105 may configure different $k_{SSB}$ values and ranges for different types of communications or UE classes in an overlapping manner.

The offset values 600 may provide for a PBCH type differentiation based on reserved bit(s) in a MIB or a PHY payload of the PBCH. For example, the base station 105 may map $k_{SSB}$ values for a second type of communications or second UE class (e.g., NR Light) to a range overlapping with $k_{SSB}$ values for a first type of communications or first set of UE classes (e.g., eMBB communications, URLLC, or the like). In some cases, the base station 105 may use reserved or unused bits of a PBCH to indicate whether or not the PBCH is for the second type of communications or second UE class (e.g., NR Light).

UEs 115 operating according to the first type of communications or first set of UE class may bypass reserved bits in $k_{SSB}$ values 605-a that range from 0 to $K_{max}$ 610-a (e.g., ranging from $0 \leq k_{SSB} \leq K_{max}$, where the $k_{SSB}$ and the $K_{max}$ are configured based on the first type of communications or first set of UE classes). Additionally or alternatively, UEs 115 operating according to the second type of communications or second UE class may process reserved bits for an indication of a PBCH type for the second type of communications or second UE class. The UEs 115 that operate according to the second type of communications or second UE class may look for the indication of the PBCH type in $k_{SSB}$ values 605-b that range from 0 to a $K_{max}$ 610-b (e.g., ranging from $0 \leq k_{SSB} \leq K_{max}$, where the $k_{SSB}$ and the $K_{max}$ are configured specific to the second type of communications or second set of UE classes). This type of indication may be considered an explicit indication by the base station 105 for $k_{SSB}$ values for different types of communications or UE classes, which may enable the base station 105 to use a same set of overlapping values for each type of communications or UE class.

Figure 7:
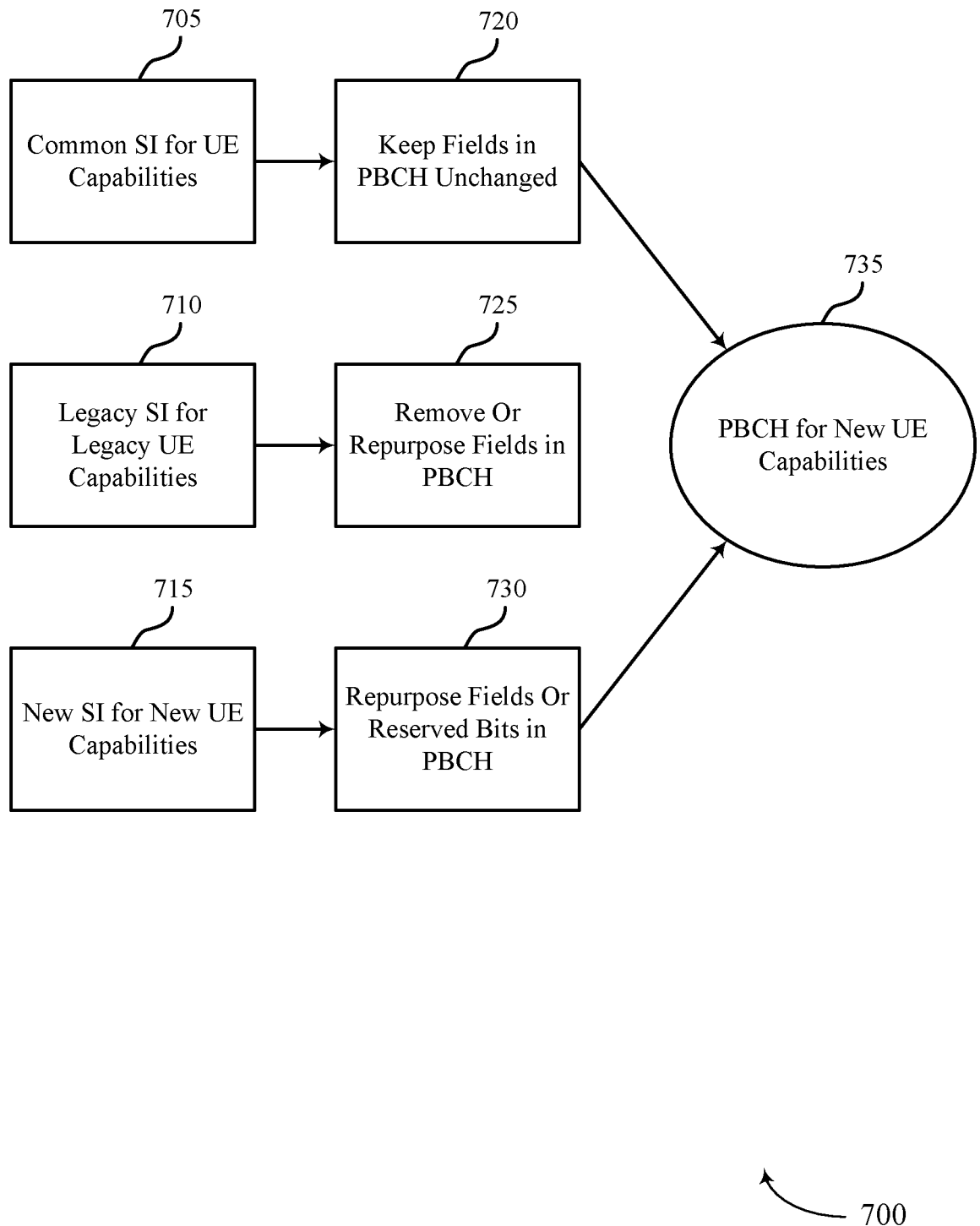
FIG. 7 illustrates an example of an information field decision tree that supports PBCH enhancement for NR Light communications in accordance with aspects of the present disclosure.

FIG. 7 illustrates an example of an information field decision tree 700 that supports PBCH enhancement for NR Light communications in accordance with aspects of the present disclosure. In some examples, information field decision tree 700 may implement aspects of wireless communications systems 100 and wireless communications system 200. As described with reference to FIG. 2, when establishing or modifying communications between a base station 105 and a UE 115, the base station 105 may indicate different UE capabilities for NR Light communications via one or more configuration parameters.

For example, the base station 105 may add information elements and fields to a PBCH to support coverage enhancement for broadcasting different downlink messages (e.g., PDCCH, PDSCH, DMRS, or the like) to UE 115. In some wireless communications systems, a CORESET0 resource configuration and a Type0-PDCCH CSS set configuration may be given by an information element "pdcch-ConfigSIB1." However, this information element may not support PDCCH repetition and frequency hopping. Additionally, default PDSCH time-domain resource allocation (TDRA) tables may be used for broadcasting PDSCHs such as SIBs and random access response (RAR) messages, which may have limitations to support PDCCH, PDSCH, or DMRS repetitions due to a $K_0=0$ of the TDRA tables (e.g., no delay between repetitions).

To mitigate these issues, the base station 105 may add fields, information elements, or both to a PBCH to support intra-slot or inter-slot repetitions and intra-slot or inter-slot frequency hopping for broadcasting a PDCCH, PDSCH, DMRS, or a combination thereof. For example, the base station 105 may add a pattern-repetition field (e.g., via one (1) bit) to indicate whether intra-slot repetition for PDCCHs or PDSCHs is enabled (e.g., a "0") or inter-slot repetition for PDCCHs or PDSCHs is enabled (e.g., a "1"). Additionally or alternatively, the base station 105 may add a level-repetition field (e.g., one (1) or two (2) bits) to indicate mapping to the level of repetitions for coverage enhancement (2, 4, 8, etc.).

The base station 105 may map these added fields to a subset of unused, reserved, or repurposed information bits carried by a PBCH, including a MIB TB, a PHY payload of the PBCH, a DMRS scrambling ID of the PBCH, or a combination thereof. For example, two reserved bits in the PHY payload for FR1 may be used for the added fields; a duplicate bit for half frame indication in the PHY payload or DMRS scrambling ID may be used for the added fields; repurposed fields or bits in a MIB of the PBCH as a result of bit-width reduction for "SFN," "dmrs-TypeA-Position," "pdcch-ConfigSIB1," or a combination thereof may be used for the added fields; or a spare bit in the MIB may be used for the added fields.

Information field decision tree 700 may illustrate which unused, reserved, or repurposed information bits carried by the PBCH to use for carrying the added fields. For example, at 705, the base station 105 may identify MSI common for UE capabilities of both a first type of communications or a first UE class (e.g., eMBB communications or URLLC) and a second type of communications or second UE class (e.g., NR Light communications). Additionally, at 710, the base station 105 may identify system information unique to UE capabilities of the first type of communications or first UE class (e.g., legacy system information for legacy UE capabilities). At 715, the base station 105 may identify system information unique to the second type of communications or second UE class (e.g., new system information for new UE capabilities).

At 720, based on identifying the common MSI for both types of communications or UE classes, the base station 105 may keep corresponding fields in the PBCH unchanged for transmitting the common MSI. At 725, based on identifying the system information unique to the first type of communications or first UE class, the base station 105 may remove or repurpose the corresponding fields in the PBCH to free up bits for carrying the added fields. At 730, based on identifying the system information unique to the second type of communications or second UE class, the base station 105 may repurpose fields or reserved bits in the PBCH to carry the added fields.

Subsequently, at 735, the base station 105 may determine the PBCH for carrying the added fields for the UE capabilities of the second type of communications or second UE class. For example, the base station 105 may transmit the PBCH carrying the added fields (e.g., intra-slot or inter-slot repetitions, intra-slot or inter-slot frequency hopping, or both for broadcasting a PDCCH, PDSCH or DMRS) based on the repurposed, reserved, or unchanged fields as identified in 720 and 730.

Figure 8A:
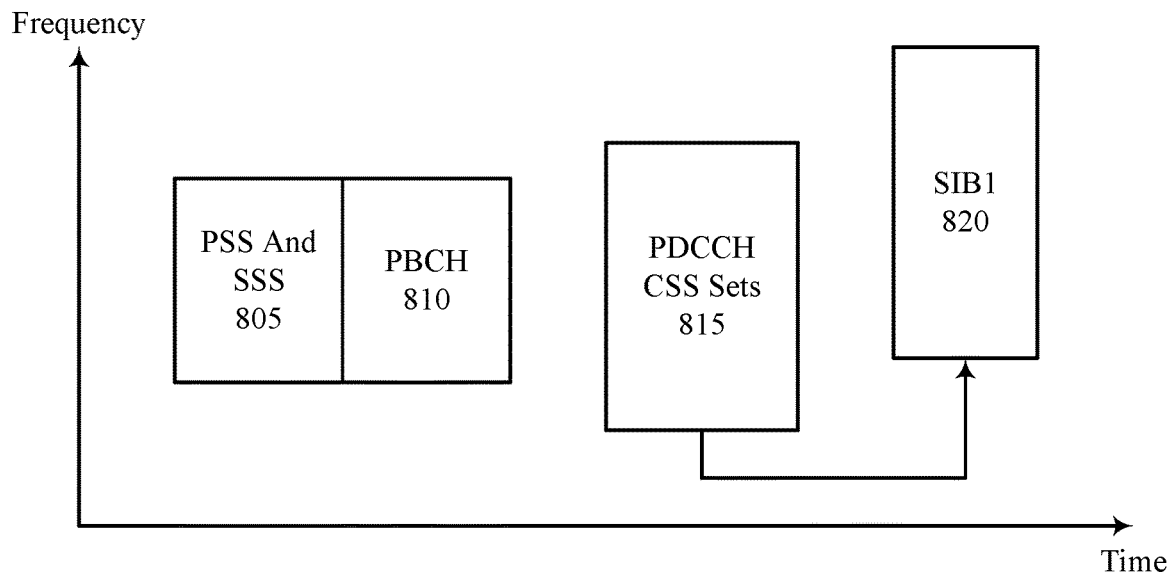
FIGS. 8A and 8B illustrate examples of time division multiplexing (TDM) patterns that support PBCH enhancement for NR Light communications in accordance with aspects of the present disclosure.
Figure 8B:
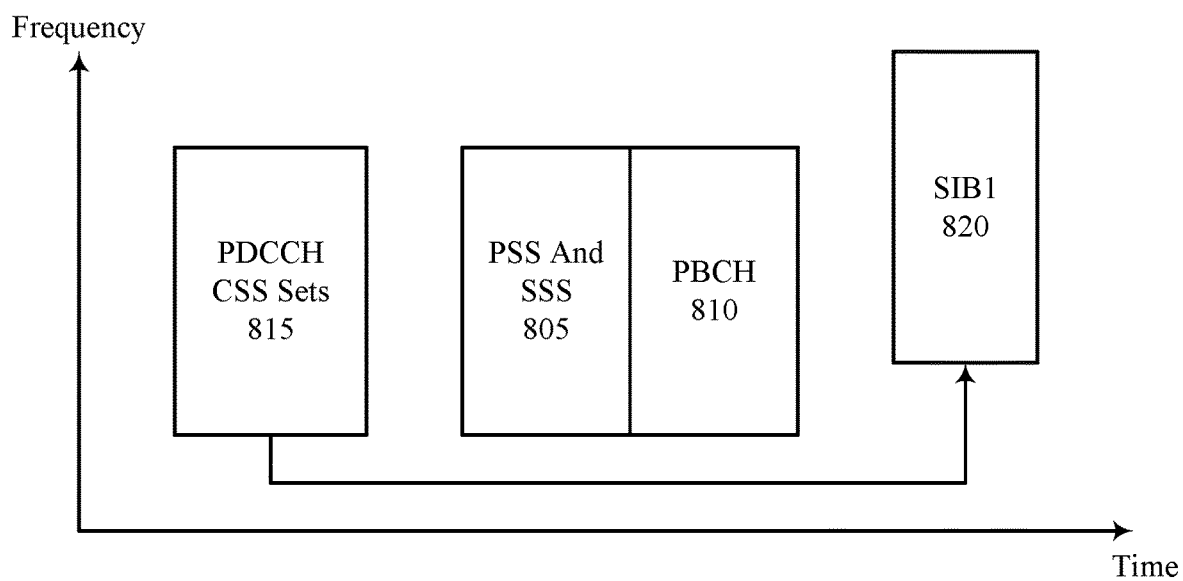

FIGS. 8A and 8B illustrate examples of TDM patterns 800 and 801 that support PBCH enhancement for NR Light communications in accordance with aspects of the present disclosure. In some examples, TDM patterns 800 and 801 may implement aspects of wireless communications systems 100 and wireless communications system 200. As described with reference to FIG. 2, a UE 115 may determine a multiplexing pattern that a base station 105 is using for transmitting downlink messages (e.g., a PBCH, an SSB, CSS sets in the PBCH, a SIB1 in the PBCH, or a combination thereof) to the UE 115 as part of NR Light communications (e.g., a second type of communications or second UE class as described herein). For example, the UE 115 may determine a multiplexing pattern for the downlink messages based on a bandwidth, an $SCS_{SSB}$ (e.g., an SCS for an SSB), and an $SCS_{Type0\text{-}PDCCH}$ (e.g., an SCS for a Type0-PDCCH or CORESET) of the UE 115 (e.g., configured for the UE 115 by the base station 105). TDM patterns 800 and 801 may represent examples of multiplexing patterns determined by the UE 115.

The TDM patterns 800 and 801 may support same or cross slot scheduling (e.g., $K_0 \geq 0$). For TDM pattern 800, the base station 105 may transmit a PSS and SSS 805 and a PBCH 810 initially. Subsequently, the base station 105 may transmit one or more PDCCH CSS sets 815 after the PSS and SSS 805 and PBCH 810 transmissions. The PDCCH CSS sets 815 may indicate where the UE 115 is to monitor for and receive a SIB1 820 from the base station 105.

Additionally or alternatively, for TDM pattern 801, the base station 105 may transmit the PDCCH CSS sets 815 before the PSS and SSS 805 and PBCH 810 transmissions, where the PDCCH CSS sets include an indication of the SIB1 820 transmission that occurs after the PSS and SSS 805 and PBCH 810 transmissions. Based on the TDM patterns 800 and 801, the base station 105 may transmit the different downlink messages across time without overlapping the downlink messages in frequency. The UE 115 may determine which TDM pattern or another type of multiplexing pattern to use based on a look-up table that is parameterized based on the combinations of the bandwidth, $SCS_{SSB}$, and $SCS_{Type0\text{-}PDCCH}$, as described with reference to FIG. 2.

Figure 9:
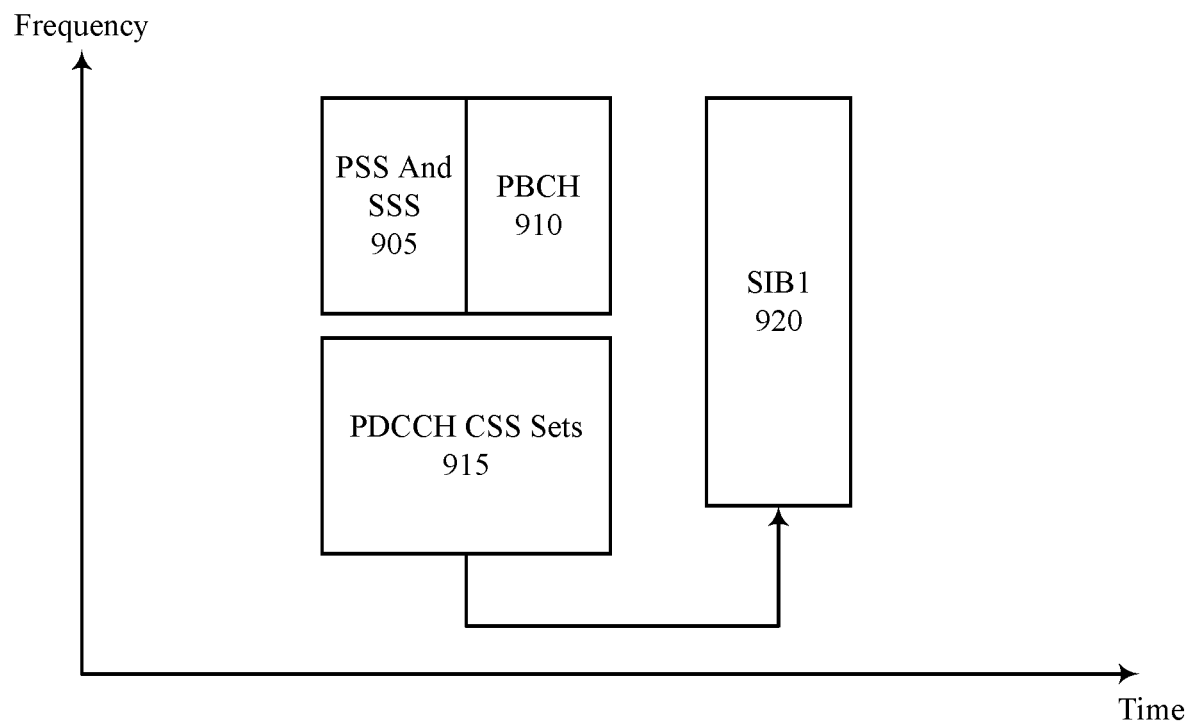
FIG. 9 illustrates an example of a frequency division multiplexing (FDM) pattern that supports PBCH enhancement for NR Light communications in accordance with aspects of the present disclosure.

FIG. 9 illustrates an example of an FDM pattern 900 that supports PBCH enhancement for NR Light communications in accordance with aspects of the present disclosure. In some examples, FDM pattern 900 may implement aspects of wireless communications systems 100 and wireless communications system 200. As described with reference to FIG. 2, a UE 115 may determine a multiplexing pattern that a base station 105 is using for transmitting downlink messages (e.g., a PBCH, an SSB, CSS sets in the PBCH, a SIB1 in the PBCH, or a combination thereof) to the UE 115 as part of NR Light communications (e.g., a second type of communications or second UE class as described herein). For example, the UE 115 may determine a multiplexing pattern for the downlink messages based on a bandwidth, an $SCS_{SSB}$ (e.g., an SCS for an SSB), and an $SCS_{Type0\text{-}PDCCH}$ (e.g., an SCS for a Type0-PDCCH or CORESET) of the UE 115 (e.g., configured for the UE 115 by the base station 105). FDM pattern 900 may represent examples of multiplexing patterns determined by the UE 115.

FDM pattern 900 may support same or cross slot scheduling (e.g., $K_0 \geq 0$). For FDM pattern 900, the base station 105 may transmit a PSS and SSS 905 and a PBCH 910 that overlap in time with one or more PDCCH CSS sets 915 (e.g., transmitted at a same time but on different frequencies). The PDCCH CSS sets 915 may then indicate where the UE 115 is to monitor for and receive a SIB1 920 from the base station 105 subsequent to the PDCCH CSS sets 915. Based on the FDM patterns 900, the base station 105 may transmit the different downlink messages at same times across different frequencies. The UE 115 may determine to use the FDM pattern or another type of multiplexing pattern based on a look-up table that is parameterized based on the combinations of the bandwidth, $SCS_{SSB}$, and $SCS_{Type0\text{-}PDCCH}$, as described with reference to FIG. 2.

Figure 10A:
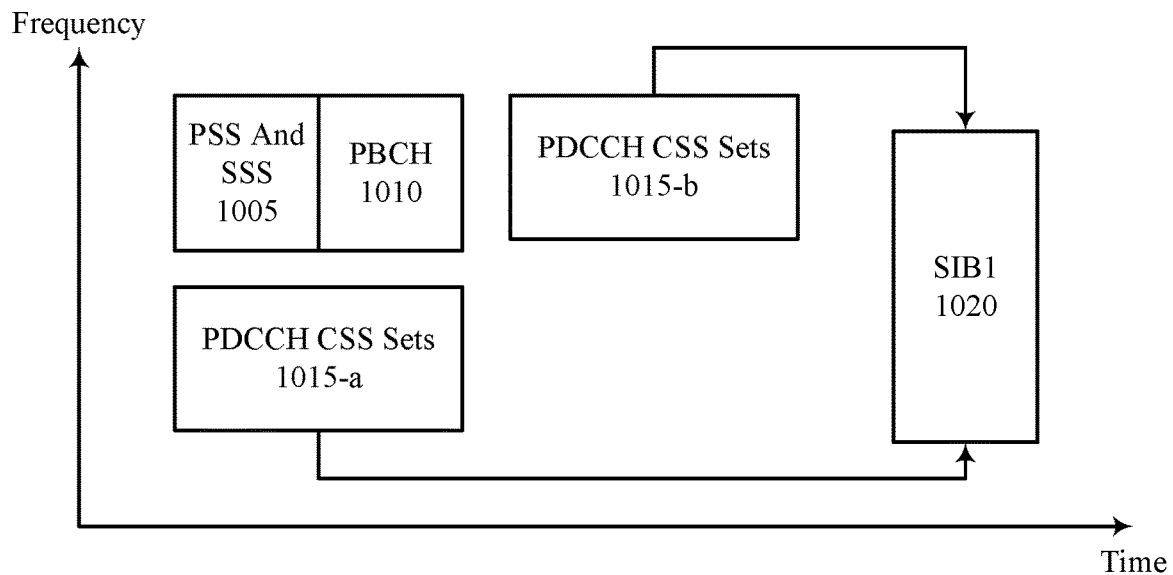
FIGS. 10A and 10B illustrates examples of hybrid multiplexing patterns that support PBCH enhancement for NR Light communications in accordance with aspects of the present disclosure.
Figure 10B:
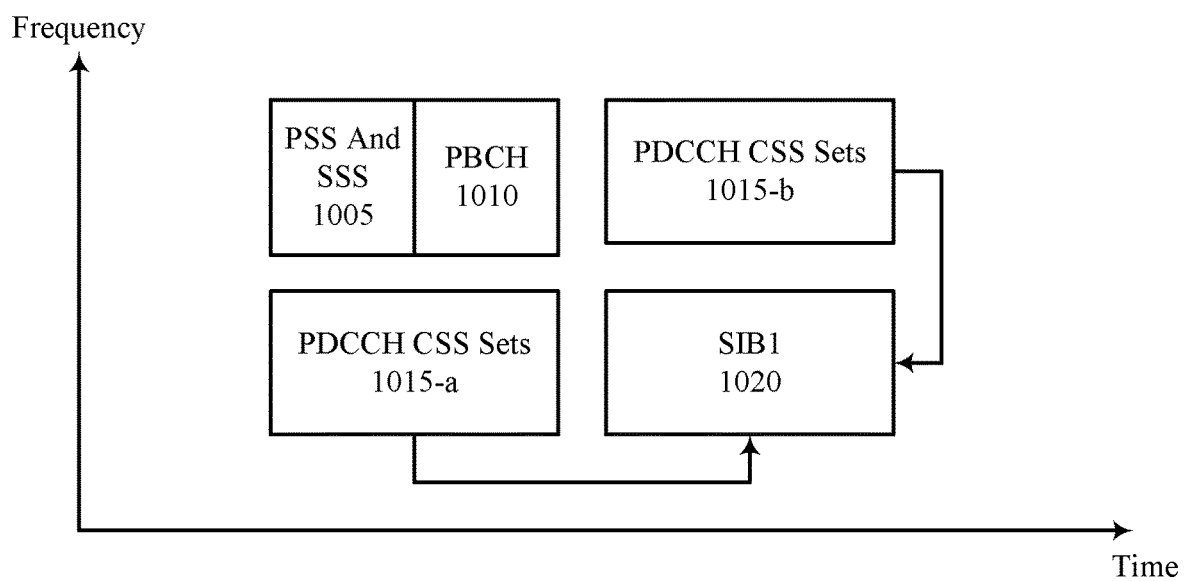

FIGS. 10A and 10B illustrate examples of hybrid multiplexing patterns 1000 and 1001 that support PBCH enhancement for NR Light communications in accordance with aspects of the present disclosure. In some examples, hybrid multiplexing patterns 1000 and 1001 may implement aspects of wireless communications systems 100 and wireless communications systems 200. As described with reference to FIG. 2, a UE 115 may determine a multiplexing pattern that a base station 105 is using for transmitting downlink messages (e.g., a PBCH, an SSB, CSS sets in the PBCH, a SIB1 in the PBCH, or a combination thereof) to the UE 115 as part of NR Light communications (e.g., a second type of communications or second UE class as described herein). For example, the UE 115 may determine a multiplexing pattern for the downlink messages based on a bandwidth, an $SCS_{SSB}$ (e.g., an SCS for an SSB), and an $SCS_{Type0-PDCCH}$ (e.g., an SCS for a Type0-PDCCH or CORESET) of the UE 115 (e.g., configured for the UE 115 by the base station 105). Hybrid multiplexing patterns 1000 and 1001 may represent examples of multiplexing patterns determined by the UE 115.

The hybrid multiplexing patterns 1000 and 1001 may support same or cross slot scheduling (e.g., $K_0 \geq 0$). Additionally, hybrid multiplexing patterns 1000 and 1001 may implement aspects of both TDM patterns and FDM patterns. For hybrid multiplexing pattern 1000, the base station 105 may transmit a PSS and SSS 1005 and a PBCH 1010 that overlap in time with one or more PDCCH CSS sets 1015-a. Subsequently, the base station 105 may also transmit one or more PDCCH CSS sets 1015-b after the PSS and SSS 1005, PBCH 1010, and PDCCH CSS sets 1015-a transmissions. The PDCCH CSS set 1015-a and PDCCH CSS set 1015-b may indicate where the UE 115 is to monitor for and receive a SIB1 1020 from the base station 105. In some cases, the SIM 1020 may be transmitted or received after the second PDCCH CSS sets 1015-b transmission.

Additionally or alternatively, for hybrid multiplexing pattern 1001, the base station 105 may transmit the PSS and SSS 1005 and the PBCH 1010 that overlap in time with the one or more PDCCH CSS sets 1015-a and may transmit the one or more PDCCH CSS sets 1015-b after the PSS and SSS 1005, PBCH 1010, and PDCCH CSS sets 1015-a transmissions. However, the PDCCH CSS sets 1015 may indicate the SIB1 1020 transmission occurs at a same time as the PDCCH CSS sets 1015-b transmission. Accordingly, based on the hybrid multiplexing patterns 1000 and 1001, the base station 105 may transmit the different downlink messages across time without overlapping the downlink messages in frequency or may transmit the different downlink message at a same times across different frequencies. The UE 115 may determine which hybrid pattern or another type of multiplexing pattern to use based on a look-up table that is parameterized based on the combinations of the bandwidth, $SCS_{SSB}$, and $SCS_{Type0-PDCCH}$, as described with reference to FIG. 2.

Figure 11:
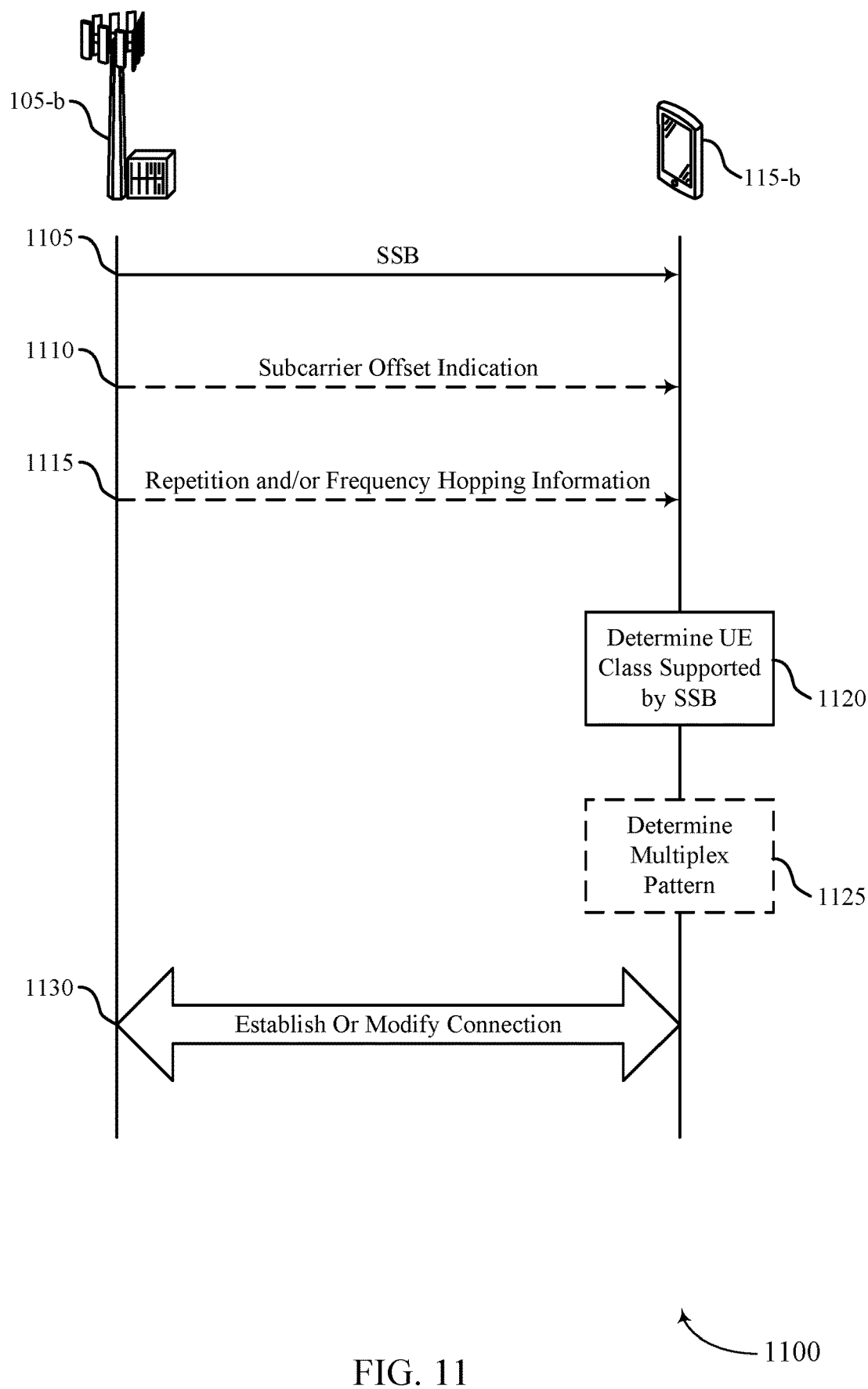
FIG. 11 illustrates an example of a process flow that supports PBCH enhancement for NR Light communications in accordance with aspects of the present disclosure.

FIG. 11 illustrates an example of a process flow 1100 that supports PBCH enhancement for NR Light communications in accordance with aspects of the present disclosure. In some examples, process flow 1100 may implement aspects of wireless communications systems 100 and wireless communications systems 200. Process flow 1100 may include a base station 105-b and a UE 115-b, which may be examples of corresponding base stations 105 and UEs 115, respectively, as described with reference to FIGS. 1-10.

In the following description of the process flow 1100, the operations between UE 115-b and base station 105-b may be transmitted in a different order than the exemplary order shown, or the operations performed by UE 115-b and base station 105-b may be performed in different orders or at different times. One or more operations may also be left out of the process flow 1100, or other operations may be added to the process flow 1100. It is to be understood that while UE 115-b and base station 105-b are shown performing a number of the operations of process flow 1100, any wireless device may perform the operations shown.

At 1105, UE 115-b may receive an SSB, the SSB including an indication of a UE class (e.g., NR Light communications) supported by the SSB, where the UE class is based on a UE bandwidth. In some examples, the UE bandwidth may be the channel bandwidth UE 115-b supports.

At 1110, UE 115-b may receive an indication of a subcarrier offset between the SSB and a CRB grid (e.g., a $k_{SSB}$ value). In some cases, UE 115-b may receive one or more bits explicitly indicating the UE class supported by the SSB (e.g., as described with reference to FIG. 6).

Additionally or alternatively, the indication of the UE class supported by the SSB may be based on a range within which the subcarrier offset falls (e.g., as described with reference to FIG. 5). In some cases, the indication of the subcarrier offset may be based on a combination of a first set of one or more bits in a first field of the SSB and a second set of one or more bits in a second field of the SSB. Accordingly, UE 115-b may determine a valid range of the subcarrier offset based on the UE class supported by the SSB, where a connection between UE 115-b and base station 105-b is established or modified based on the subcarrier offset in the SSB falling within the valid range.

At 1115, UE 115-b may receive repetition information for a broadcast channel (e.g., a PBCH) from base station 105-b (e.g., as described with reference to FIG. 7), where the repetition information is based on the UE class supported by the SSB. In some cases, the repetition information may include an indication of support for intra-slot repetition over the broadcast channel, an indication of support for inter-slot repetition over the broadcast channel, or a combination thereof. Additionally or alternatively, the repetition information may include an indication of a number of transmission repetitions configured for the broadcast channel. In some cases, the repetition information may be received in a MIB, a PHY payload of the broadcast channel, a DMRS scrambling ID of the broadcast channel, or any combination thereof.

Additionally or alternatively, UE 115-b may receive frequency hopping information for a broadcast channel (e.g., a PBCH) from base station 105-b (e.g., as described with reference to FIG. 7), where the frequency hopping information is based on the UE class supported by the SSB. In some cases, the frequency hopping information may include an indication of support for intra-slot frequency hopping over the broadcast channel, an indication of support for inter-slot frequency hopping over the broadcast channel, or a combination thereof. Additionally, the frequency hopping information may be received in a MIB, a PHY payload of the broadcast channel, a DMRS scrambling ID of the broadcast channel, or any combination thereof.

At 1120, UE 115-b may determine, based on the indication, that UE 115-b belongs to the UE class supported by the SSB. In some examples, UE 115-b may transmit capability information indicating the UE class to base station 105-b.

At 1125, UE 115-b may determine, based on the UE class supported by the SSB, a multiplexing pattern (e.g., as shown above with reference to FIGS. 8-10) for the SSB, a CORESET for broadcast control information, and a SIB (e.g., a SIB1). In some cases, UE 115-b may map the multiplexing pattern to a combination of the UE bandwidth, an SCS associated with the SSB (e.g., $SCS_{SSB}$), and an SCS of the broadcast control information of the CORESET (e.g., $SCS_{Type0-PDCCH}$).

At 1130, UE 115-*b* and base station 105-*b* may establish or modify a connection between each other using the SSB based on the determination that UE 115-*b* belongs to the UE class supported by the SSB.

Figure 12:
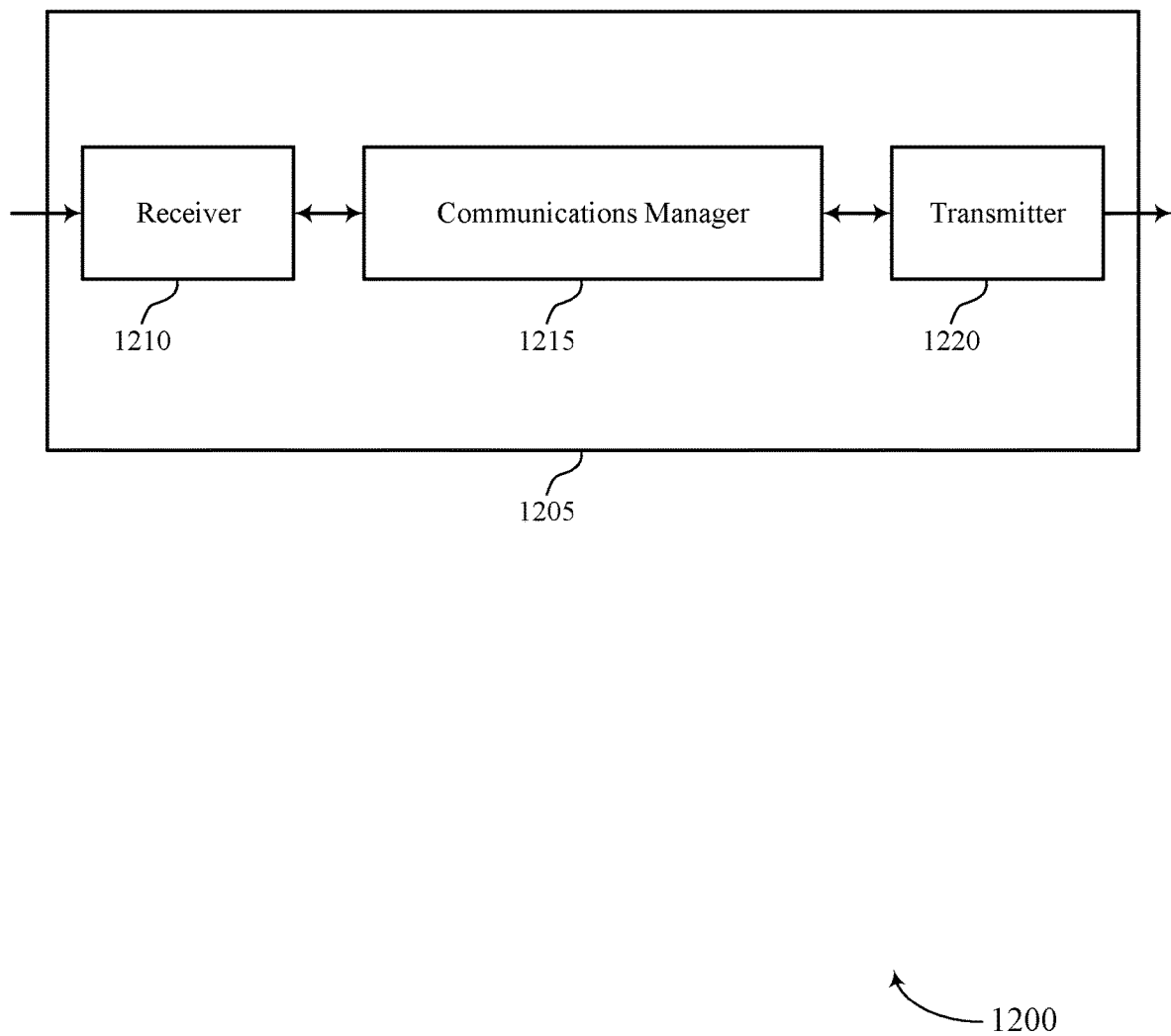
FIGS. 12 and 13 show block diagrams of devices that support PBCH enhancement for NR Light communications in accordance with aspects of the present disclosure.

FIG. 12 shows a block diagram 1200 of a device 1205 that supports PBCH enhancement for NR Light communications in accordance with aspects of the present disclosure. The device 1205 may be an example of aspects of a UE 115 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, information related to PBCH enhancement for NR Light communications, or a combination thereof). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may receive an SSB at a UE, the SSB including an indication of a UE class supported by the SSB, where the UE class is based on a UE bandwidth, determine, based on the indication, that the UE belongs to the UE class supported by the SSB, and establish or modifying a connection between the UE and a base station using the SSB based on the determination. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
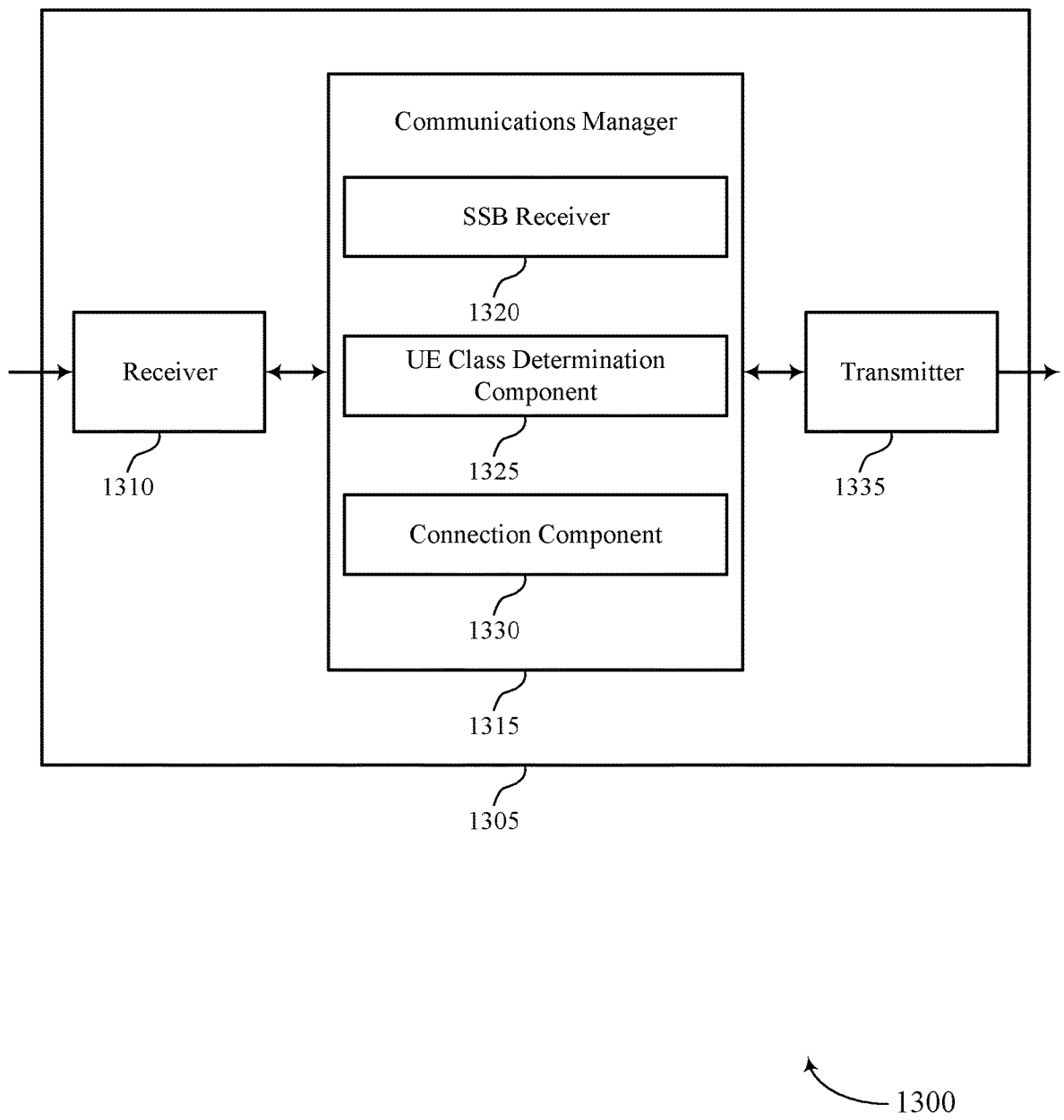

FIG. 13 shows a block diagram 1300 of a device 1305 that supports PBCH enhancement for NR Light communications in accordance with aspects of the present disclosure. The device 1305 may be an example of aspects of a device 1205, or a UE 115 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, information related to PBCH enhancement for NR Light communications, or a combination thereof). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include an SSB receiver 1320, a UE class determination component 1325, and a connection component 1330. The communications manager 1315 may be an example of aspects of the communications manager 1510 described herein.

The SSB receiver 1320 may receive an SSB at a UE, the SSB including an indication of a UE class supported by the SSB, where the UE class is based on a UE bandwidth. The UE class determination component 1325 may determine, based on the indication, that the UE belongs to the UE class supported by the SSB. The connection component 1330 may establish or modifying a connection between the UE and a base station using the SSB based on the determination. The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
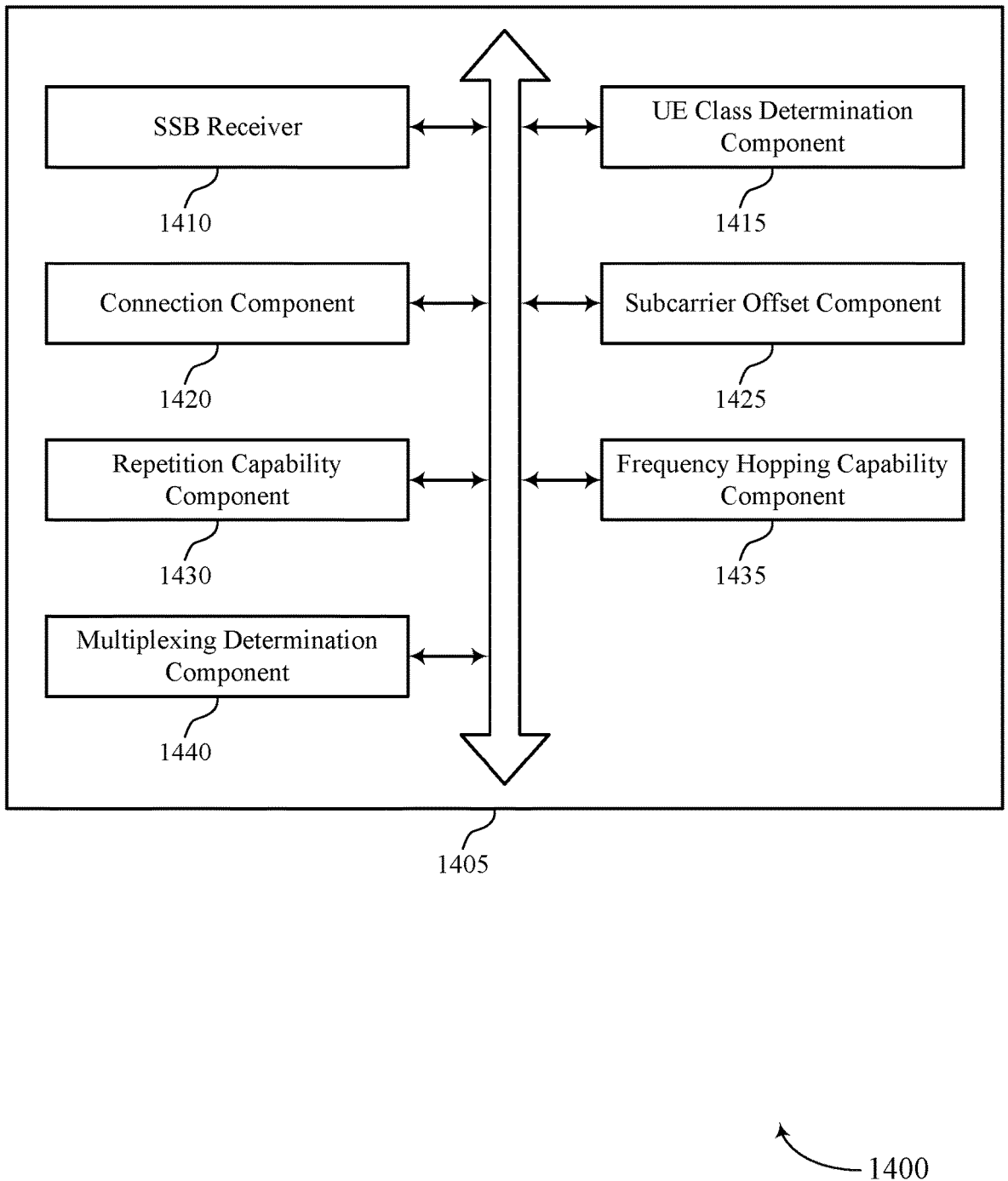
FIG. 14 shows a block diagram of a communications manager that supports PBCH enhancement for NR Light communications in accordance with aspects of the present disclosure.

FIG. 14 shows a block diagram 1400 of a communications manager 1405 that supports PBCH enhancement for NR Light communications in accordance with aspects of the present disclosure. The communications manager 1405 may be an example of aspects of a communications manager 1215, a communications manager 1315, or a communications manager 1510 described herein. The communications manager 1405 may include an SSB receiver 1410, a UE class determination component 1415, a connection component 1420, a subcarrier offset component 1425, a repetition capability component 1430, a frequency hopping capability component 1435, and a multiplexing determination component 1440. Each of these modules may communicate, directly or indirectly, with one another (e.g., via one or more buses).

The SSB receiver 1410 may receive an SSB at a UE, the SSB including an indication of a UE class supported by the SSB, where the UE class is based on a UE bandwidth. The UE class determination component 1415 may determine, based on the indication, that the UE belongs to the UE class supported by the SSB. In some examples, the UE class determination component 1415 may receive one or more bits explicitly indicating the UE class supported by the SSB.

The connection component 1420 may establish or modifying a connection between the UE and a base station using the SSB based on the determination. The subcarrier offset component 1425 may receive an indication of a subcarrier offset between the SSB and a CRB grid, where establishing or modifying the connection between the UE and the base station is based on the subcarrier offset. In some examples, the subcarrier offset component 1425 may determine a valid range of the subcarrier offset based on the UE class supported by the SSB, where establishing or modifying the connection between the UE and the base station is further based on the subcarrier offset in the SSB falling within the valid range.

In some cases, the indication of the UE class supported by the SSB is based on a range within which the subcarrier offset falls. In some cases, the indication of the subcarrier offset is based on a combination of a first set of one or more bits in a first field of the SSB and a second set of one or more bits in a second field of the SSB.

The repetition capability component 1430 may receive repetition information for a broadcast channel from the base station, where the repetition information is based on the UE class supported by the SSB. The repetition information may include an indication of support for intra-slot repetition over the broadcast channel, an indication of support for inter-slot repetition over the broadcast channel, or a combination thereof. In some cases, the repetition information includes an indication of a number of transmission repetitions configured for the broadcast channel. In some cases, the repetition information is received in one or more of a MIB, a physical layer payload of the broadcast channel, a DMRS scrambling identifier of the broadcast channel, or any combination thereof.

The frequency hopping capability component 1435 may receive frequency hopping information for a broadcast channel from the base station, where the frequency hopping information is based on the UE class supported by the SSB. In some cases, the frequency hopping information may include an indication of support for intra-slot frequency hopping over the broadcast channel, an indication of support for inter-slot frequency hopping over the broadcast channel, or a combination thereof. In some cases, the frequency hopping information is received in one or more of a MIB, a physical layer payload of the broadcast channel, a DMRS scrambling identifier of the broadcast channel, or any combination thereof.

The multiplexing determination component 1440 may determine, based on the UE class supported by the SSB, a multiplexing pattern for the SSB, a control resource set for broadcast control information, and a system information block. In some examples, the multiplexing determination component 1440 may map the multiplexing pattern to a combination of the UE bandwidth, a subcarrier spacing associated with the SSB, and a subcarrier spacing of the broadcast control information of the control resource set. In some examples, the base station may receive, from the UE, capability information indicating the UE class.

Figure 15:
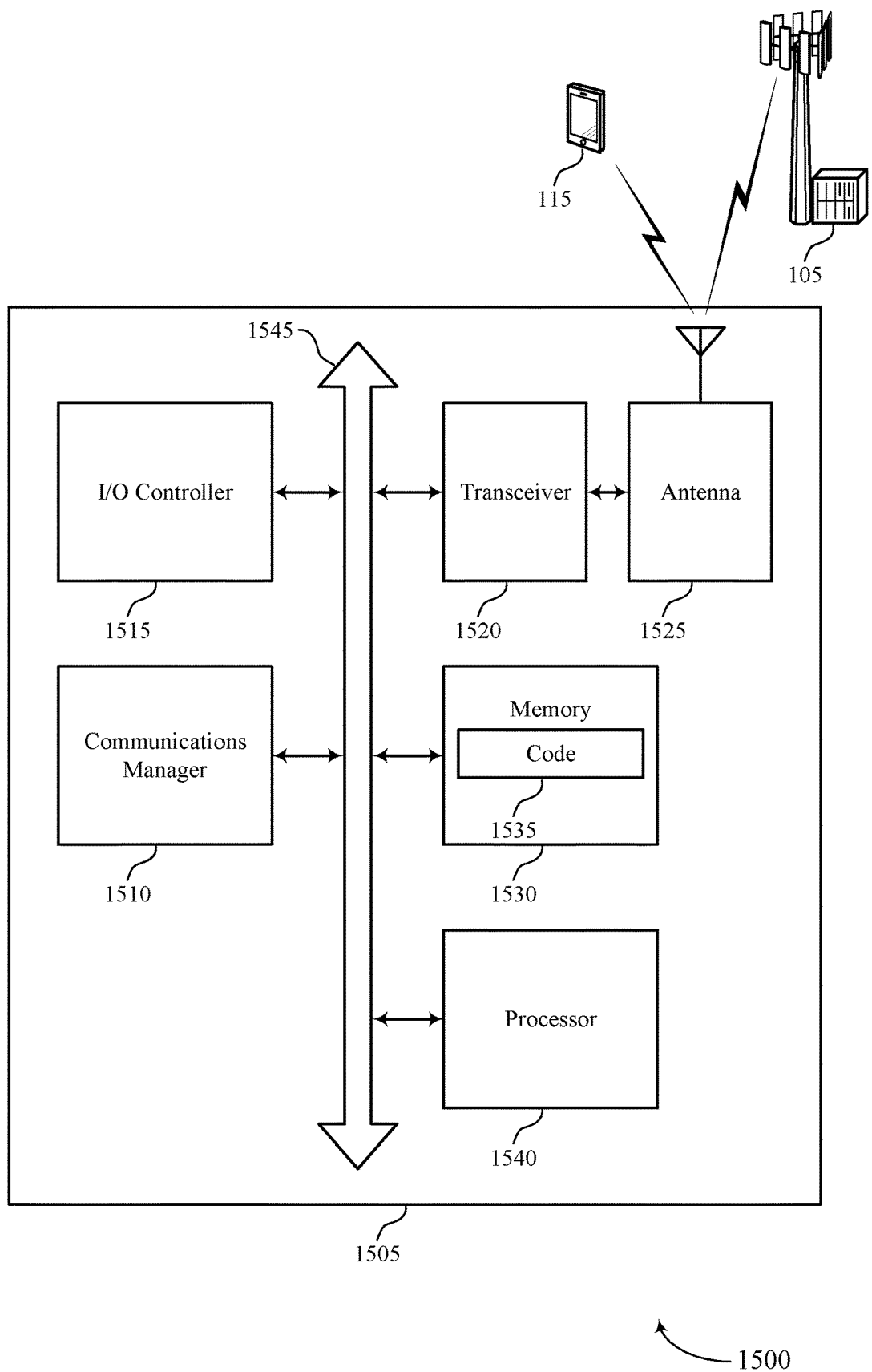
FIG. 15 shows a diagram of a system including a device that supports PBCH enhancement for NR Light communications in accordance with aspects of the present disclosure.

FIG. 15 shows a diagram of a system 1500 including a device 1505 that supports PBCH enhancement for NR Light communications in accordance with aspects of the present disclosure. The device 1505 may be an example of or include the components of device 1205, device 1305, or a UE 115 as described herein. The device 1505 may include components for bi-directional voice and data communications including components for transmitting and receiving communications, including a communications manager 1510, an I/O controller 1515, a transceiver 1520, an antenna 1525, memory 1530, and a processor 1540. These components may be in electronic communication via one or more buses (e.g., bus 1545).

The communications manager 1510 may receive an SSB at a UE, the SSB including an indication of a UE class supported by the SSB, where the UE class is based on a UE bandwidth, determine, based on the indication, that the UE belongs to the UE class supported by the SSB, and establish or modifying a connection between the UE and a base station using the SSB based on the determination.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include random-access memory (RAM) and read-only memory (ROM). The memory 1530 may store computer-readable, computer-executable code 1535 including instructions that, when executed, cause the processor to perform various functions described herein. In some cases, the memory 1530 may contain, among other things, a basic I/O system (BIOS) which may control basic hardware or software operation such as the interaction with peripheral components or devices.

The processor 1540 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting PBCH enhancement for NR Light communications).

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
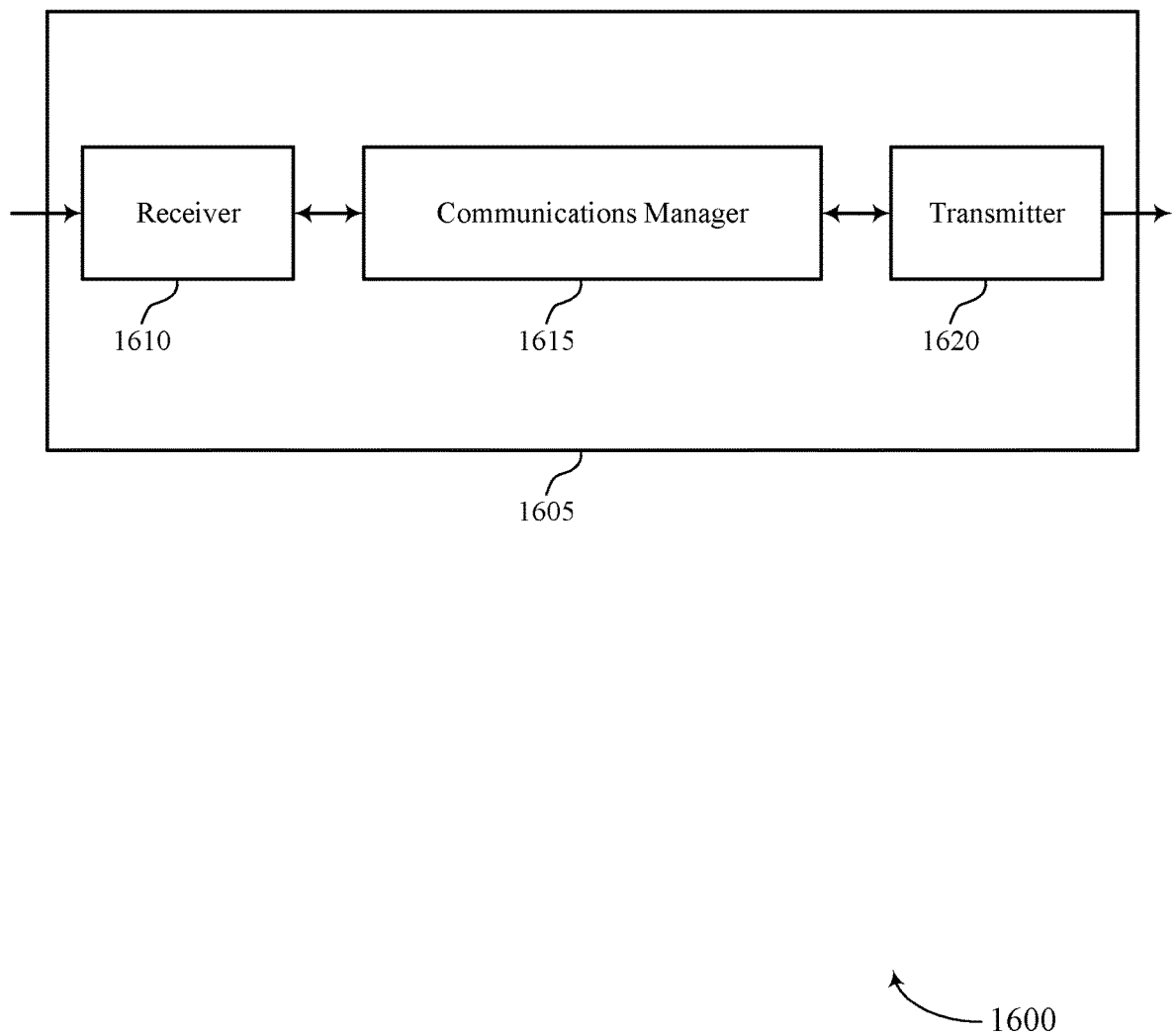
FIGS. 16 and 17 show block diagrams of devices that support PBCH enhancement for NR Light communications in accordance with aspects of the present disclosure.

FIG. 16 shows a block diagram 1600 of a device 1605 that supports PBCH enhancement for NR Light communications in accordance with aspects of the present disclosure. The device 1605 may be an example of aspects of a base station 105 as described herein. The device 1605 may include a receiver 1610, a communications manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, information related to PBCH enhancement for NR Light communications, or a combination thereof.). Information may be passed on to other components of the device 1605. The receiver 1610 may be an example of aspects of the transceiver 1920 described with reference to FIG. 19. The receiver 1610 may utilize a single antenna or a set of antennas.

The communications manager 1615 may transmit an SSB to a UE, the SSB including an indication of a UE class supported by the SSB, where the UE class is based on a UE bandwidth, determine that the UE belongs to the UE class supported by the SSB, and establish or modifying a connection between the UE and the base station using the SSB based on the determination. The communications manager 1615 may be an example of aspects of the communications manager 1910 described herein.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
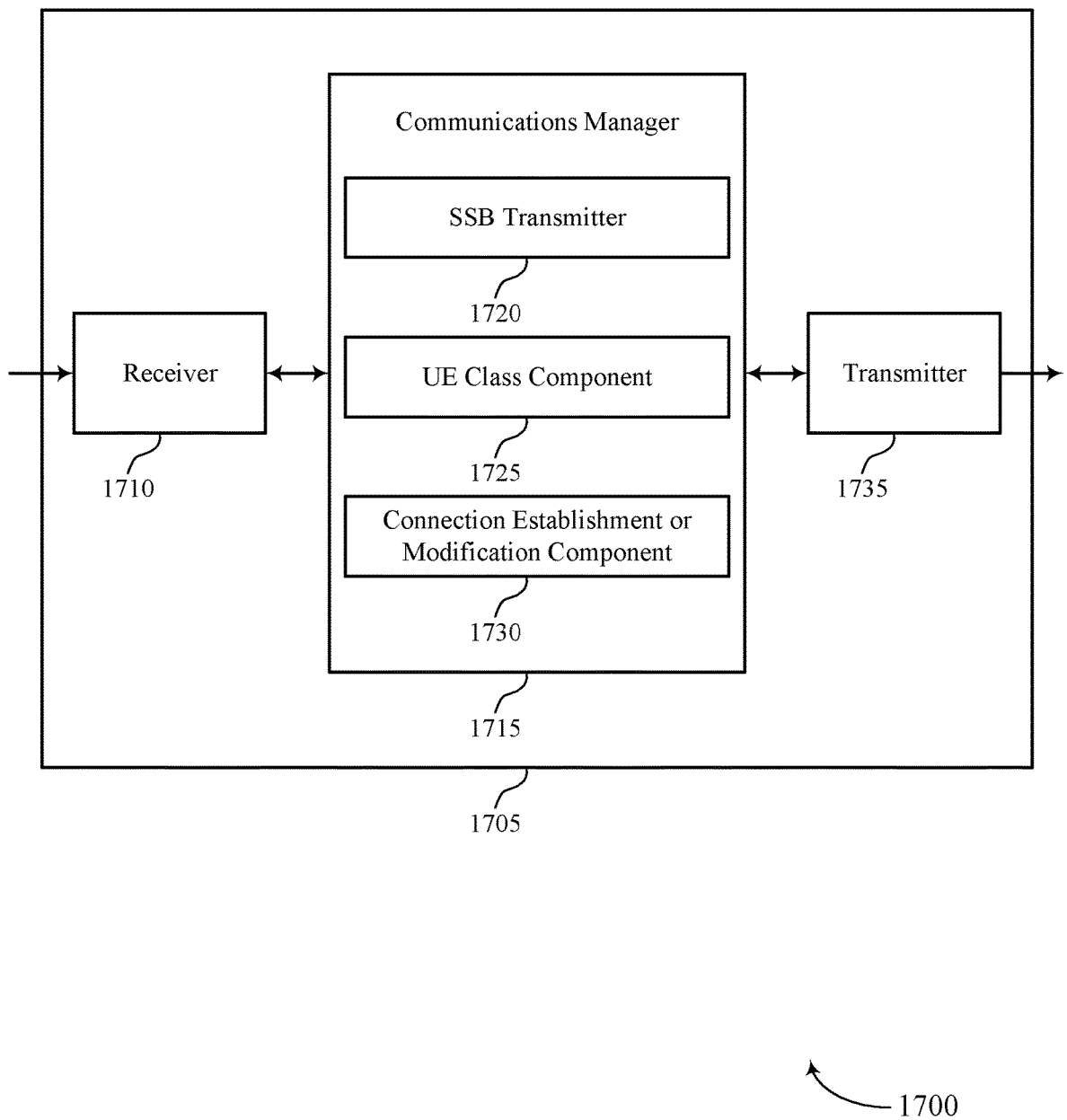

FIG. 17 shows a block diagram 1700 of a device 1705 that supports PBCH enhancement for NR Light communications in accordance with aspects of the present disclosure. The device 1705 may be an example of aspects of a device 1605, or a base station 105 as described herein. The device 1705 may include a receiver 1710, a communications manager 1715, and a transmitter 1735. The device 1705 may also include a processor. Each of these components may be in communication with one another (e.g., via one or more buses).

The receiver 1710 may receive information such as packets, user data, or control information associated with various information channels (e.g., control channels, data channels, information related to PBCH enhancement for NR Light communications, or a combination thereof). Information may be passed on to other components of the device 1705. The receiver 1710 may be an example of aspects of the transceiver 1920 described with reference to FIG. 19. The receiver 1710 may utilize a single antenna or a set of antennas.

The communications manager 1715 may be an example of aspects of the communications manager 1615 as described herein. The communications manager 1715 may include an SSB transmitter 1720, a UE class component 1725, and a connection establishment/modification component 1730. The communications manager 1715 may be an example of aspects of the communications manager 1910 described herein.

The SSB transmitter 1720 may transmit an SSB to a UE, the SSB including an indication of a UE class supported by the SSB, where the UE class is based on a UE bandwidth. The UE class component 1725 may determine that the UE belongs to the UE class supported by the SSB. The connection establishment or modification component 1730 may establish or modifying a connection between the UE and the base station using the SSB based on the determination. The transmitter 1735 may transmit signals generated by other components of the device 1705. In some examples, the transmitter 1735 may be collocated with a receiver 1710 in a transceiver module. For example, the transmitter 1735 may be an example of aspects of the transceiver 1920 described with reference to FIG. 19. The transmitter 1735 may utilize a single antenna or a set of antennas.

Figure 18:
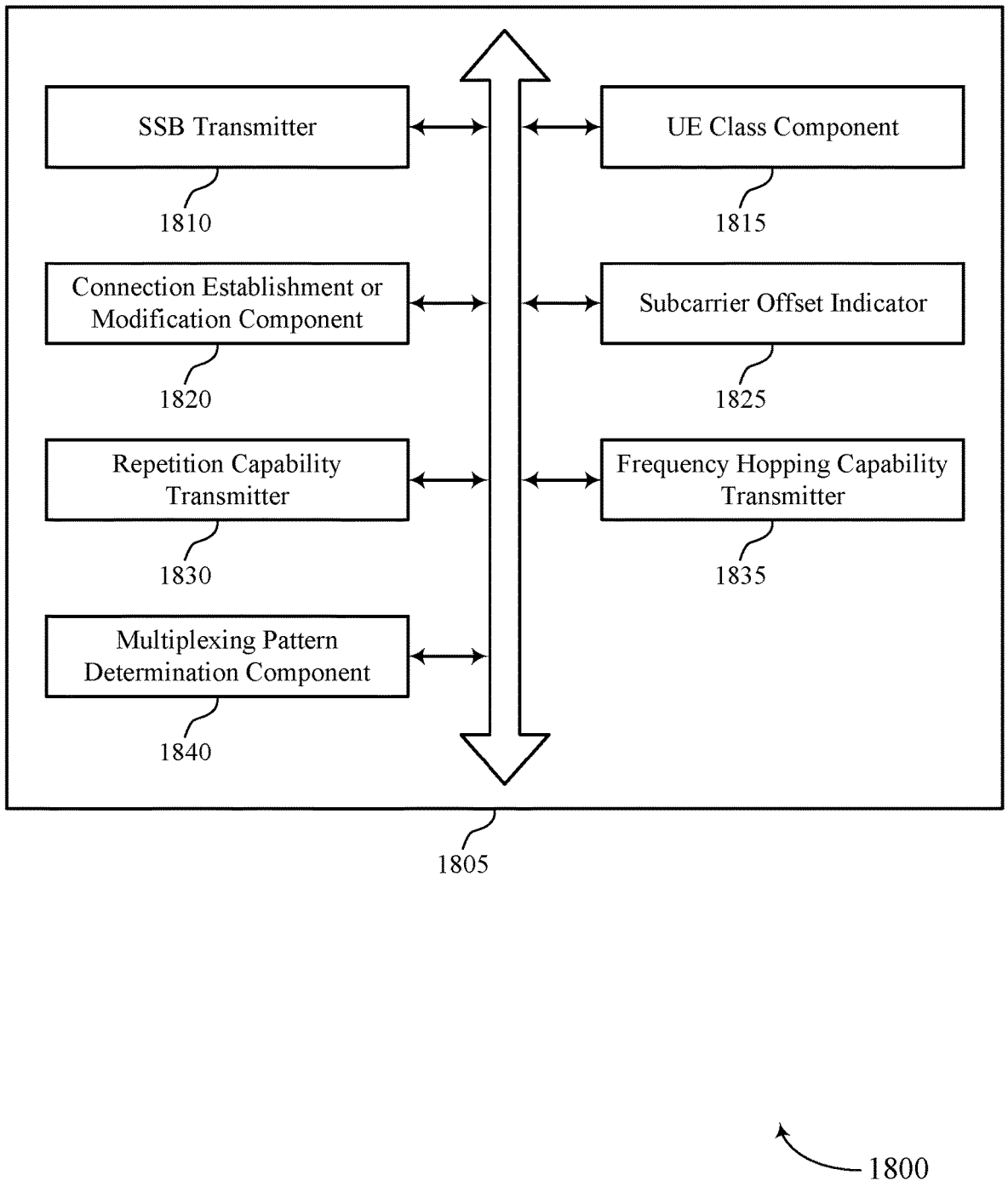
FIG. 18 shows a block diagram of a communications manager that supports PBCH enhancement for NR Light communications in accordance with aspects of the present disclosure.

FIG. 18 shows a block diagram 1800 of a communications manager 1805 that supports PBCH enhancement for NR Light communications in accordance with aspects of the present disclosure. The communications manager 1805 may be an example of aspects of a communications manager 1615, a communications manager 1715, or a communications manager 1910 described herein. The communications manager 1805 may include an SSB transmitter 1810, a UE class component 1815, a connection establishment/modification component 1820, a subcarrier offset indicator 1825, a repetition capability transmitter 1830, a frequency hopping capability transmitter 1835, and a multiplexing pattern determination component 1840. Each of these modules may communicate, directly or indirectly, with one another (e.g., via one or more buses).

The SSB transmitter 1810 may transmit an SSB to a UE, the SSB including an indication of a UE class supported by the SSB, where the UE class is based on a UE bandwidth. The UE class component 1815 may determine that the UE belongs to the UE class supported by the SSB. In some examples, the UE class component 1815 may transmit one or more bits explicitly indicating the UE class supported by the SSB.

The connection establishment or modification component 1820 may establish or modifying a connection between the UE and the base station using the SSB based on the determination.

The subcarrier offset indicator 1825 may transmit an indication of a subcarrier offset between the SSB and a CRB grid, where establishing or modifying the connection between the UE and the base station is based on the subcarrier offset. In some examples, the subcarrier offset indicator 1825 may determine a valid range of the subcarrier offset based on the UE class supported by the SSB, where establishing or modifying the connection between the UE and the base station is further based on the subcarrier offset in the SSB falling within the valid range. In some cases, the indication of the UE class supported by the SSB is based on a range within which the subcarrier offset falls. In some cases, the indication of the subcarrier offset is based on a combination of a first set of one or more bits in a first field of the SSB and a second set of one or more bits in a second field of the SSB.

The repetition capability transmitter 1830 may transmit repetition information for a broadcast channel to the UE, where the repetition information is based on the UE class supported by the SSB. In some cases, the repetition information includes an indication of support for intra-slot repetition over the broadcast channel, an indication of support for inter-slot repetition over the broadcast channel, or a combination thereof. In some cases, the repetition information includes an indication of a number of transmission repetitions configured for the broadcast channel. In some cases, the repetition information is received in one or more of a MIB, a physical layer payload of the broadcast channel, a DMRS scrambling identifier of the broadcast channel, or any combination thereof.

The frequency hopping capability transmitter 1835 may transmit frequency hopping information for a broadcast channel to the UE, where the frequency hopping information is based on the UE class supported by the SSB. In some cases, the frequency hopping information may include an indication of support for intra-slot frequency hopping over the broadcast channel, an indication of support for inter-slot frequency hopping over the broadcast channel, or a combination thereof. In some cases, the frequency hopping information is received in one or more of a MIB, a physical layer payload of the broadcast channel, a DMRS scrambling identifier of the broadcast channel, or any combination thereof.

The multiplexing pattern determination component 1840 may determine, based on the UE class supported by the SSB, a multiplexing pattern for the SSB, a control resource set for broadcast control information, and a system information block. In some examples, the multiplexing pattern determination component 1840 may map the multiplexing pattern to a combination of the UE bandwidth, a subcarrier spacing associated with the SSB, and a subcarrier spacing of the broadcast control information of the control resource set.

Figure 19:
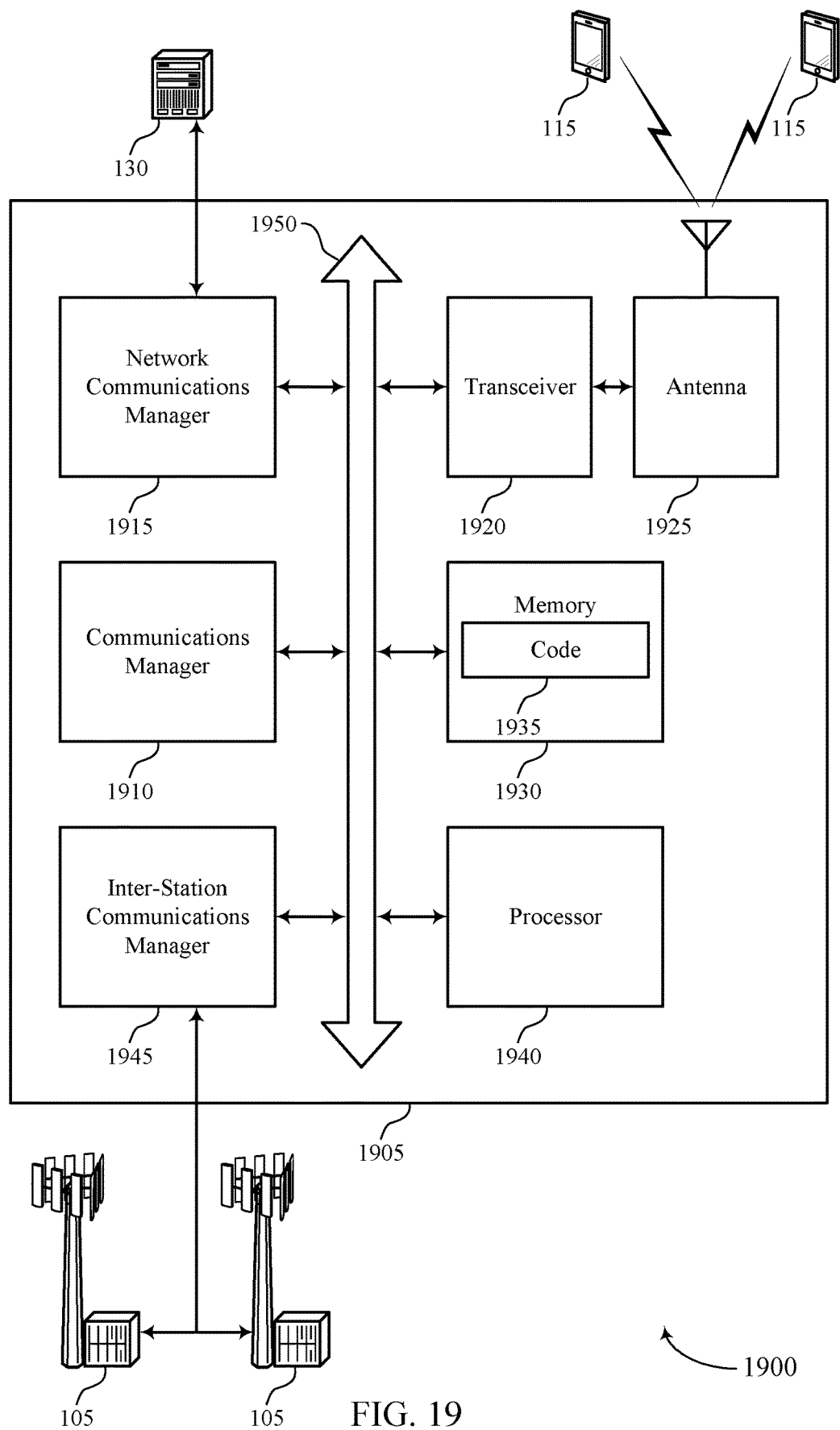
FIG. 19 shows a diagram of a system including a device that supports PBCH enhancement for NR Light communications in accordance with aspects of the present disclosure.

FIG. 19 shows a diagram of a system 1900 including a device 1905 that supports PBCH enhancement for NR Light communications in accordance with aspects of the present disclosure. The device 1905 may be an example of or include the components of device 1605, device 1705, or a base station 105 as described herein. The device 1905 may include components for bi-directional voice and data communications including components for transmitting and receiving communications, including a communications manager 1910, a network communications manager 1915, a transceiver 1920, an antenna 1925, memory 1930, a processor 1940, and an inter-station communications manager 1945. These components may be in electronic communication via one or more buses (e.g., bus 1950).

The communications manager 1910 may transmit an SSB to a UE, the SSB including an indication of a UE class supported by the SSB, where the UE class is based on a UE bandwidth, determine that the UE belongs to the UE class supported by the SSB, and establish or modifying a connection between the UE and the base station using the SSB based on the determination.

The network communications manager 1915 may manage communications with the core network (e.g., via one or more wired backhaul links). For example, the network communications manager 1915 may manage the transfer of data communications for client devices, such as one or more UEs 115.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM, ROM, or a combination thereof. The memory 1930 may store computer-readable code 1935 including instructions that, when executed by a processor (e.g., the processor 1940) cause the device to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some cases, a memory controller may be integrated into processor 1940. The processor 1940 may be configured to execute computer-readable instructions stored in a memory (e.g., the memory 1930) to cause the device 1905 to perform various functions (e.g., functions or tasks supporting PBCH enhancement for NR Light communications).

The inter-station communications manager 1945 may manage communications with other base station 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communication network technology to provide communication between base stations 105.

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
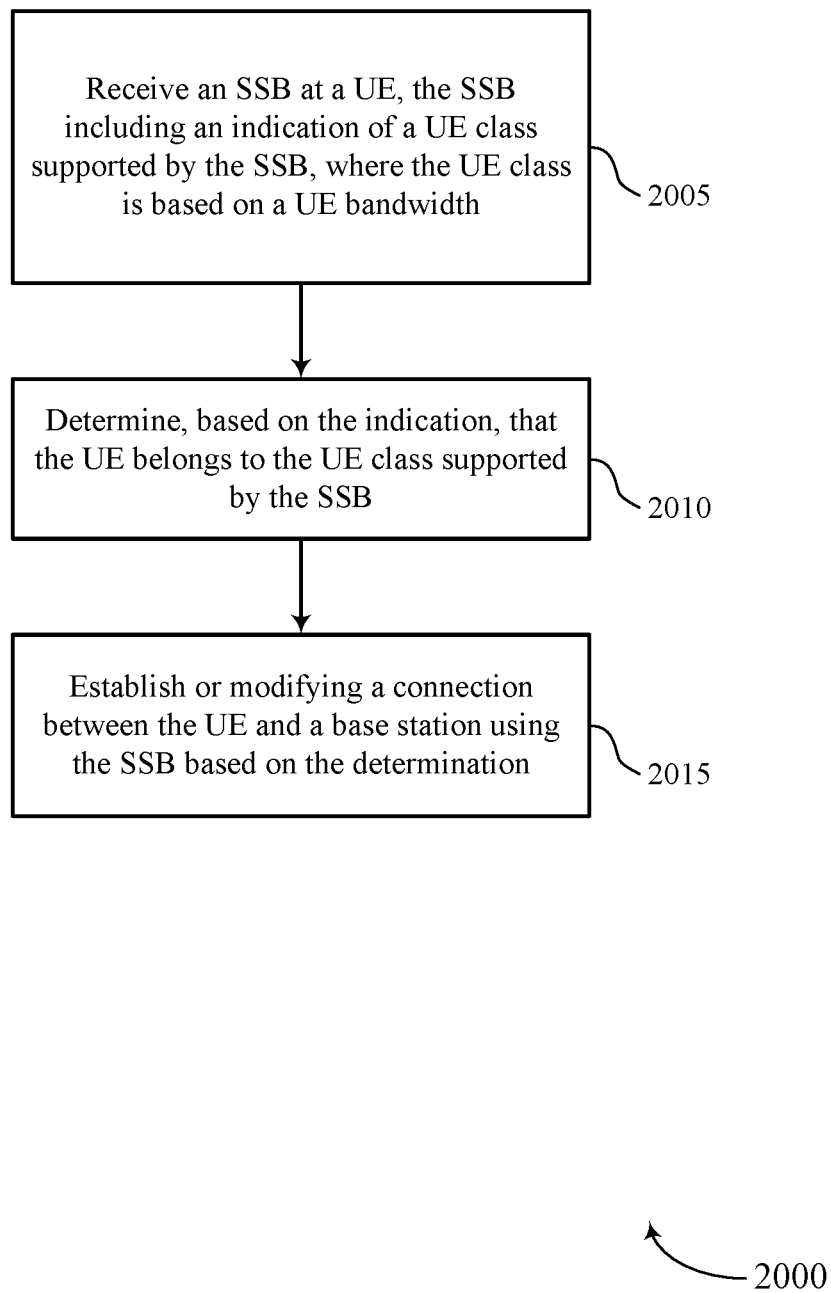
FIGS. 20 through 26 show flowcharts illustrating methods that support PBCH enhancement for NR Light communications in accordance with aspects of the present disclosure.

FIG. 20 shows a flowchart illustrating a method 2000 that supports PBCH enhancement for NR Light communications in accordance with aspects of the present disclosure. The operations of method 2000 may be implemented by a UE 115 or its components as described herein. For example, the operations of method 2000 may be performed by a communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2005, the UE may receive an SSB at a UE, the SSB including an indication of a UE class supported by the SSB, where the UE class is based on a UE bandwidth. The operations of 2005 may be performed according to the methods described herein. In some examples, aspects of the operations of 2005 may be performed by an SSB receiver as described with reference to FIGS. 12 through 15.

At 2010, the UE may determine, based on the indication, that the UE belongs to the UE class supported by the SSB. The operations of 2010 may be performed according to the methods described herein. In some examples, aspects of the operations of 2010 may be performed by a UE class determination component as described with reference to FIGS. 12 through 15.

At 2015, the UE may establish or modifying a connection between the UE and a base station using the SSB based on the determination. The operations of 2015 may be performed according to the methods described herein. In some examples, aspects of the operations of 2015 may be performed by a connection component as described with reference to FIGS. 12 through 15.

Figure 21:
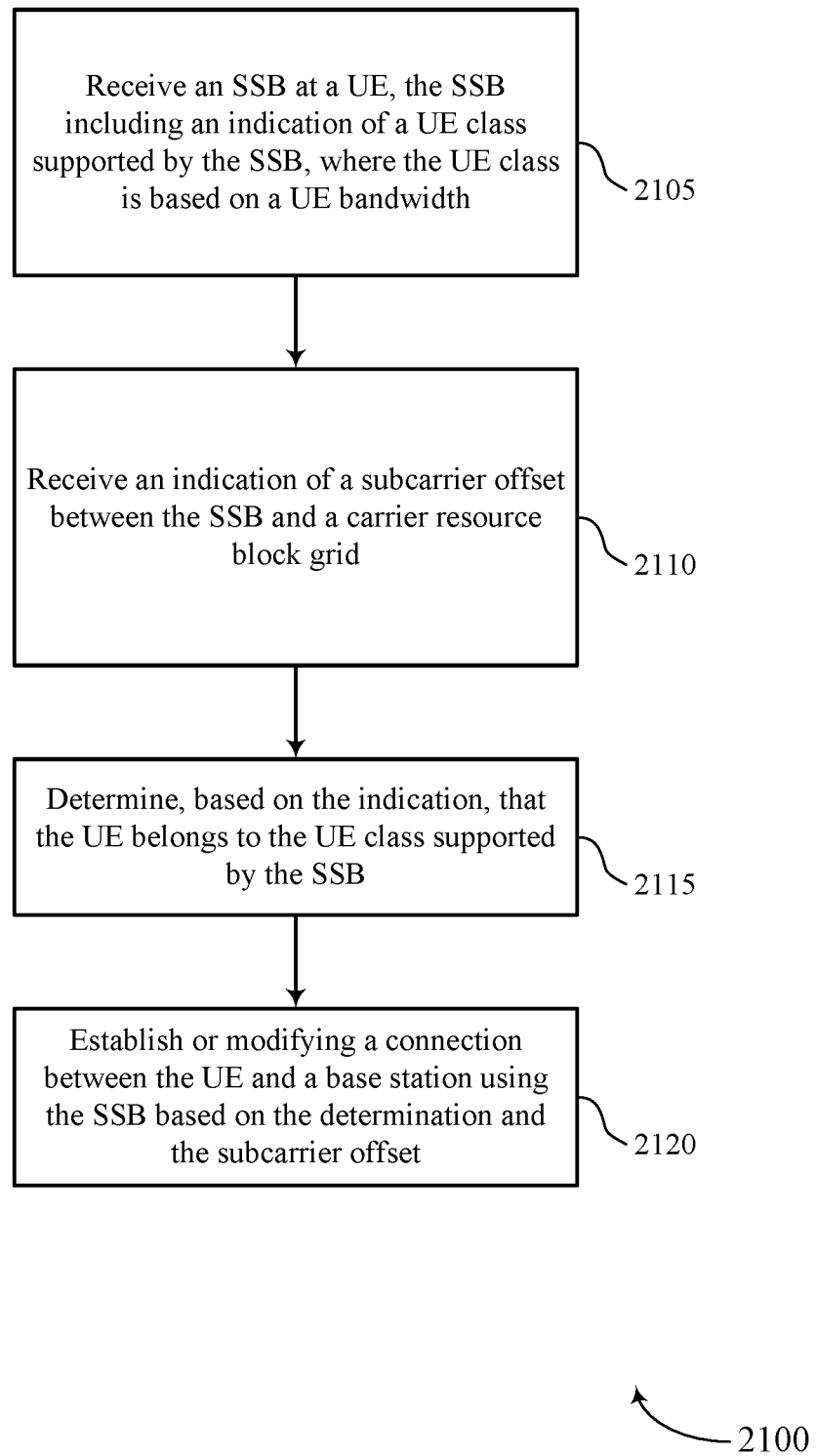

FIG. 21 shows a flowchart illustrating a method 2100 that supports PBCH enhancement for NR Light communications in accordance with aspects of the present disclosure. The operations of method 2100 may be implemented by a UE 115 or its components as described herein. For example, the operations of method 2100 may be performed by a communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2105, the UE may receive an SSB at a UE, the SSB including an indication of a UE class supported by the SSB, where the UE class is based on a UE bandwidth. The operations of 2105 may be performed according to the methods described herein. In some examples, aspects of the operations of 2105 may be performed by an SSB receiver as described with reference to FIGS. 12 through 15.

At 2110, the UE may receive an indication of a subcarrier offset between the SSB and a CRB grid. The operations of 2110 may be performed according to the methods described herein. In some examples, aspects of the operations of 2110 may be performed by a subcarrier offset component as described with reference to FIGS. 12 through 15.

At 2115, the UE may determine, based on the indication, that the UE belongs to the UE class supported by the SSB. The operations of 2115 may be performed according to the methods described herein. In some examples, aspects of the operations of 2115 may be performed by a UE class determination component as described with reference to FIGS. 12 through 15.

At 2120, the UE may establish or modifying a connection between the UE and a base station using the SSB based on the determination and the subcarrier offset. The operations of 2120 may be performed according to the methods described herein. In some examples, aspects of the operations of 2120 may be performed by a connection component as described with reference to FIGS. 12 through 15.

Figure 22:
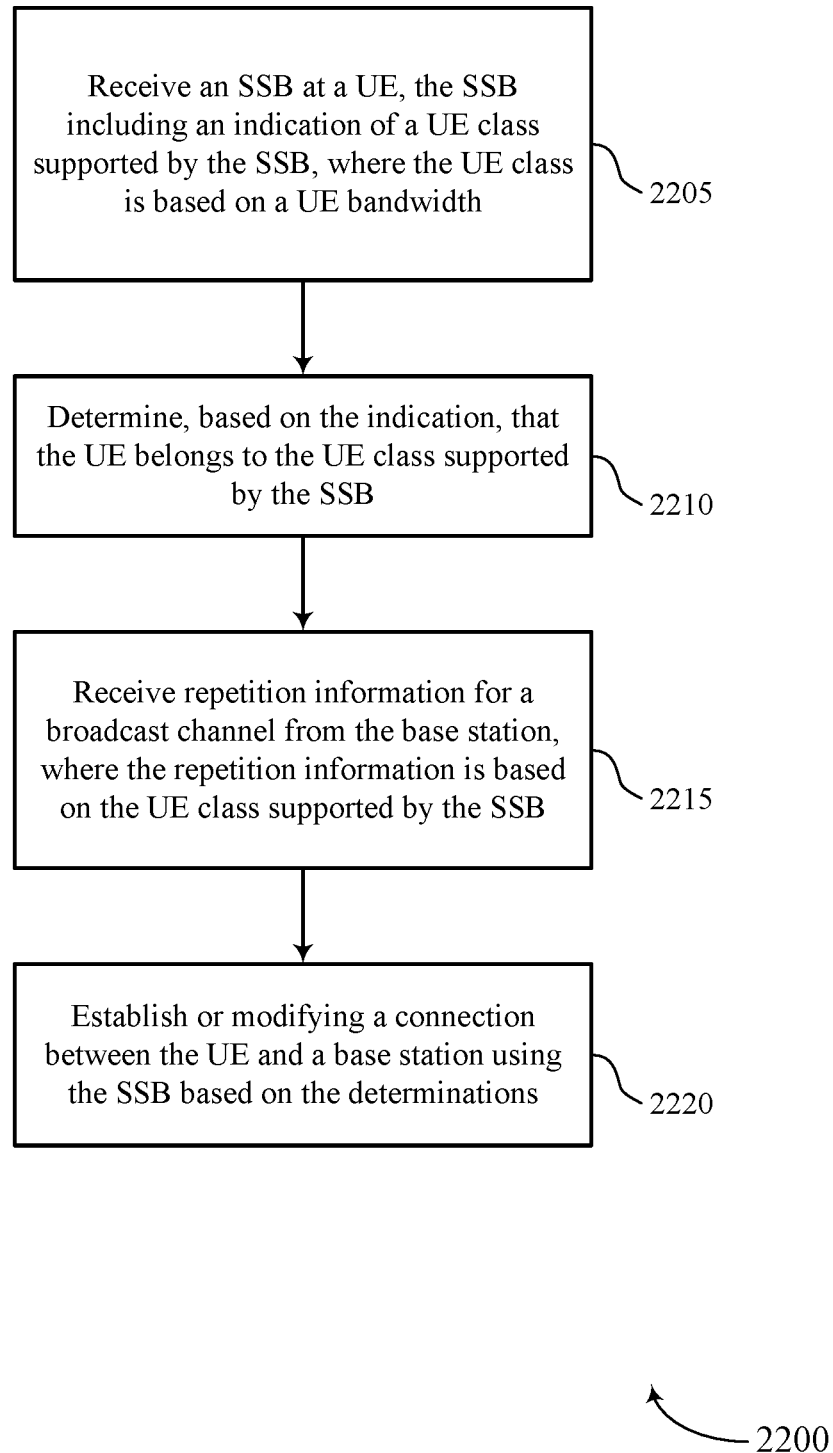

FIG. 22 shows a flowchart illustrating a method 2200 that supports PBCH enhancement for NR Light communications in accordance with aspects of the present disclosure. The operations of method 2200 may be implemented by a UE 115 or its components as described herein. For example, the operations of method 2200 may be performed by a communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2205, the UE may receive an SSB at a UE, the SSB including an indication of a UE class supported by the SSB, where the UE class is based on a UE bandwidth. The operations of 2205 may be performed according to the methods described herein. In some examples, aspects of the operations of 2205 may be performed by an SSB receiver as described with reference to FIGS. 12 through 15.

At 2210, the UE may determine, based on the indication, that the UE belongs to the UE class supported by the SSB. The operations of 2210 may be performed according to the methods described herein. In some examples, aspects of the operations of 2210 may be performed by a UE class determination component as described with reference to FIGS. 12 through 15.

At 2215, the UE may receive repetition information for a broadcast channel from the base station, where the repetition information is based on the UE class supported by the SSB. The operations of 2215 may be performed according to the methods described herein. In some examples, aspects of the operations of 2215 may be performed by a repetition capability component as described with reference to FIGS. 12 through 15.

At 2220, the UE may establish or modifying a connection between the UE and a base station using the SSB based on the determination. The operations of 2220 may be performed according to the methods described herein. In some examples, aspects of the operations of 2220 may be performed by a connection component as described with reference to FIGS. 12 through 15.

Figure 23:
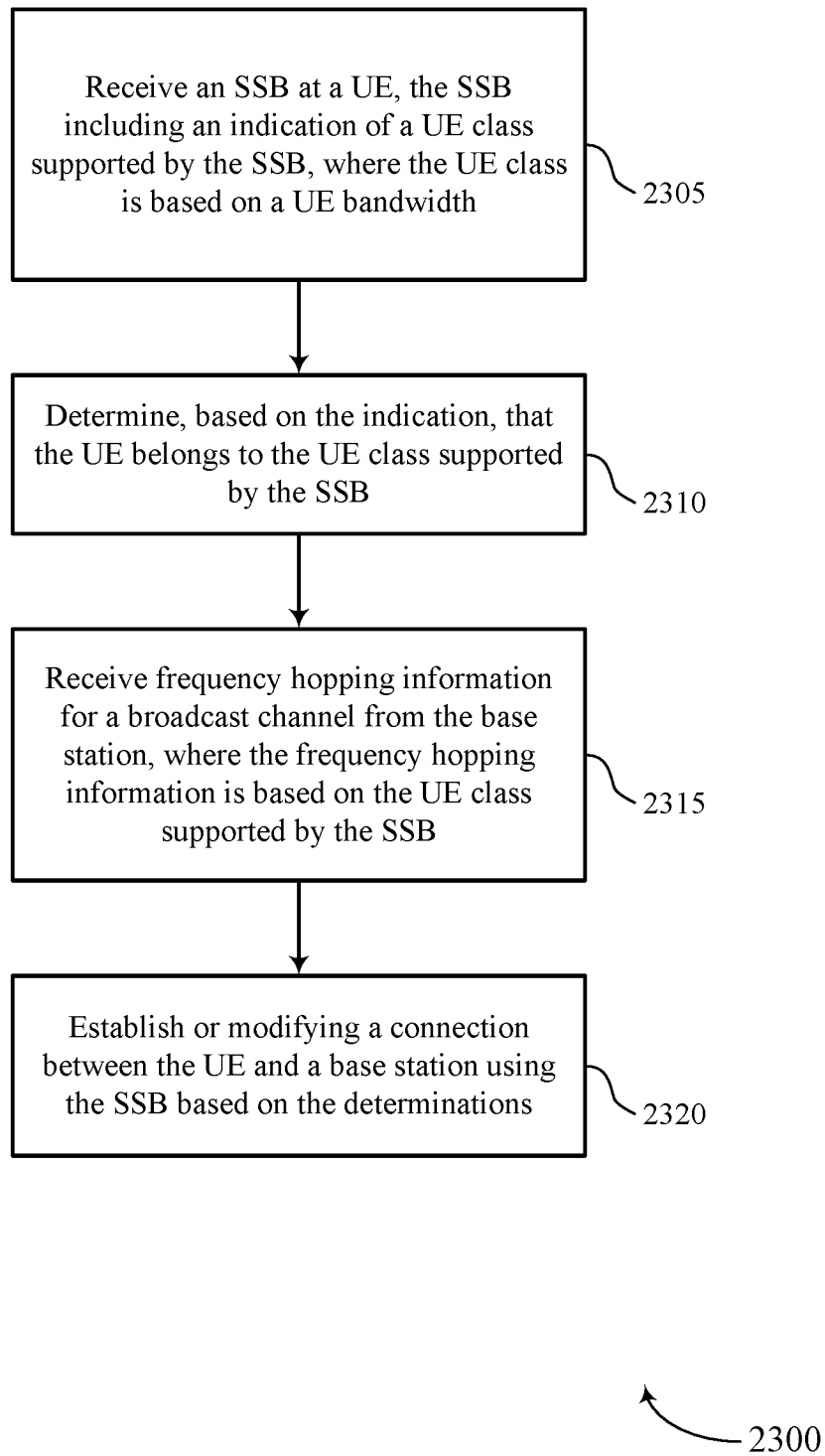

FIG. 23 shows a flowchart illustrating a method 2300 that supports PBCH enhancement for NR Light communications in accordance with aspects of the present disclosure. The operations of method 2300 may be implemented by a UE 115 or its components as described herein. For example, the operations of method 2300 may be performed by a communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2305, the UE may receive an SSB at a UE, the SSB including an indication of a UE class supported by the SSB, where the UE class is based on a UE bandwidth. The operations of 2305 may be performed according to the methods described herein. In some examples, aspects of the operations of 2305 may be performed by an SSB receiver as described with reference to FIGS. 12 through 15.

At 2310, the UE may determine, based on the indication, that the UE belongs to the UE class supported by the SSB. The operations of 2310 may be performed according to the methods described herein. In some examples, aspects of the operations of 2310 may be performed by a UE class determination component as described with reference to FIGS. 12 through 15.

At 2315, the UE may receive frequency hopping information for a broadcast channel from the base station, where the frequency hopping information is based on the UE class supported by the SSB. The operations of 2315 may be performed according to the methods described herein. In some examples, aspects of the operations of 2315 may be performed by a frequency hopping capability component as described with reference to FIGS. 12 through 15.

At 2320, the UE may establish or modifying a connection between the UE and a base station using the SSB based on the determination. The operations of 2320 may be performed according to the methods described herein. In some examples, aspects of the operations of 2320 may be performed by a connection component as described with reference to FIGS. 12 through 15.

Figure 24:
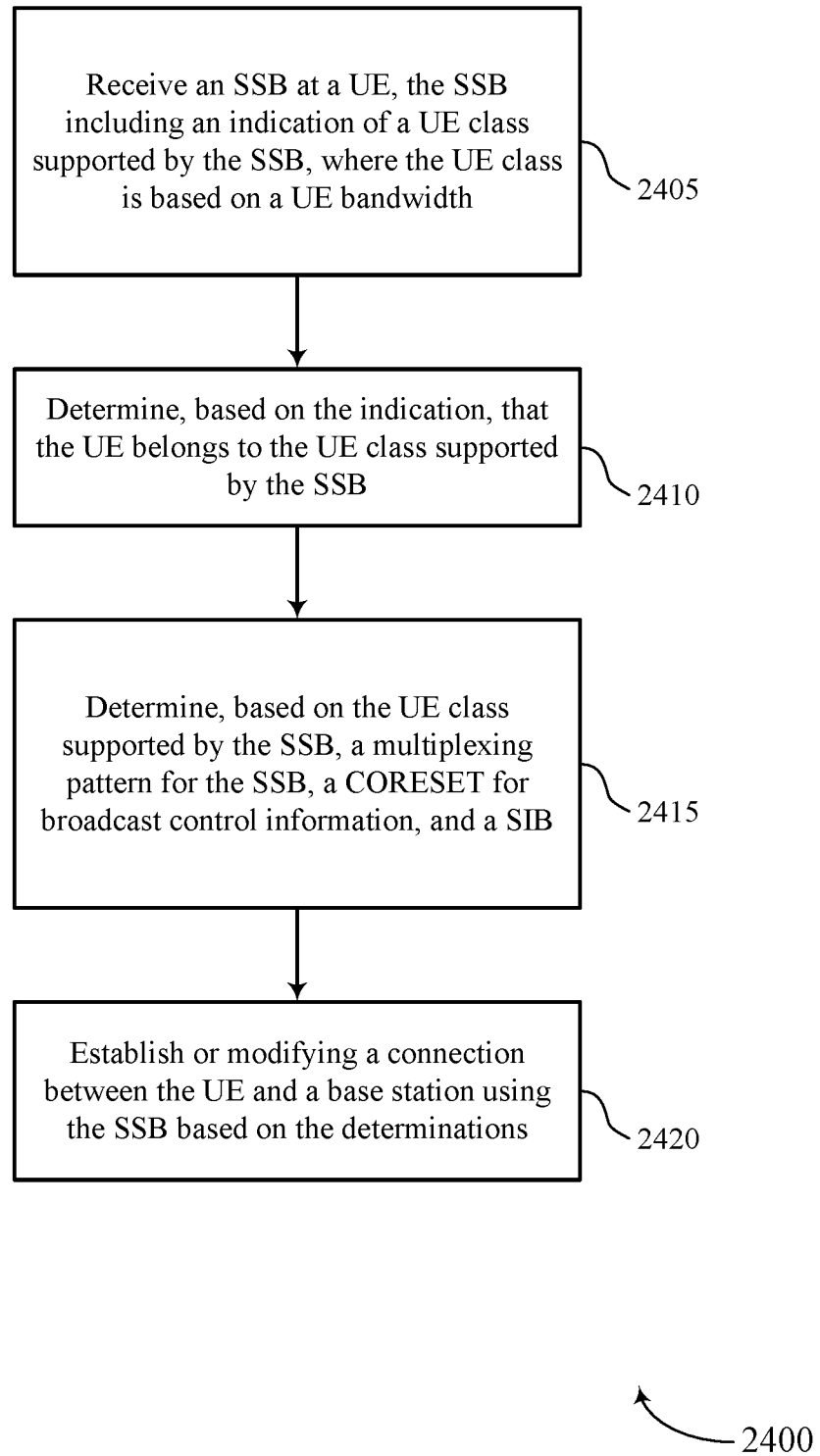

FIG. 24 shows a flowchart illustrating a method 2400 that supports PBCH enhancement for NR Light communications in accordance with aspects of the present disclosure. The operations of method 2400 may be implemented by a UE 115 or its components as described herein. For example, the operations of method 2400 may be performed by a communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2405, the UE may receive an SSB at a UE, the SSB including an indication of a UE class supported by the SSB, where the UE class is based on a UE bandwidth. The operations of 2405 may be performed according to the methods described herein. In some examples, aspects of the operations of 2405 may be performed by an SSB receiver as described with reference to FIGS. 12 through 15.

At 2410, the UE may determine, based on the indication, that the UE belongs to the UE class supported by the SSB. The operations of 2410 may be performed according to the methods described herein. In some examples, aspects of the operations of 2410 may be performed by a UE class determination component as described with reference to FIGS. 12 through 15.

At 2415, the UE may determine, based on the UE class supported by the SSB, a multiplexing pattern for the SSB, a control resource set for broadcast control information, and a system information block. The operations of 2415 may be performed according to the methods described herein. In some examples, aspects of the operations of 2415 may be performed by a multiplexing determination component as described with reference to FIGS. 12 through 15.

At 2420, the UE may establish or modifying a connection between the UE and a base station using the SSB based on the determinations. The operations of 2420 may be performed according to the methods described herein. In some examples, aspects of the operations of 2420 may be performed by a connection component as described with reference to FIGS. 12 through 15.

Figure 25:
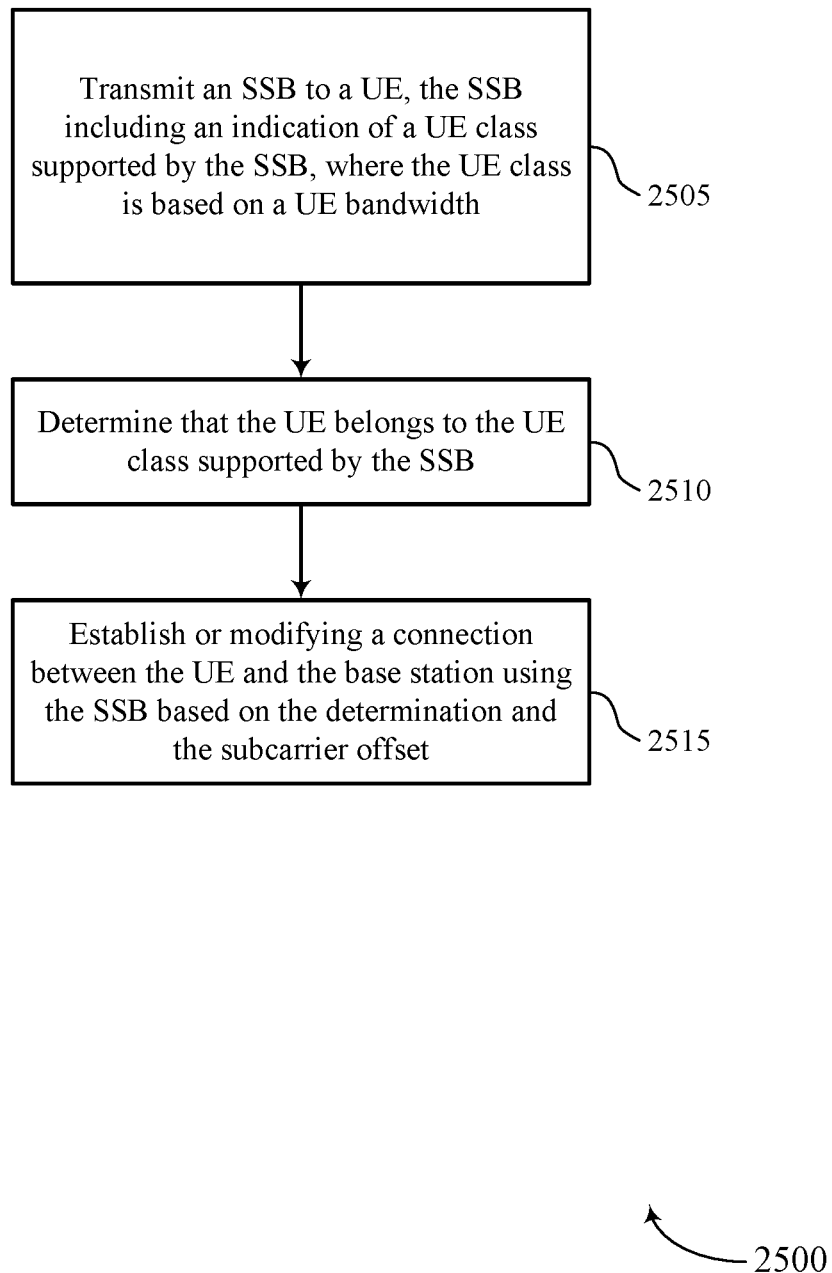

FIG. 25 shows a flowchart illustrating a method 2500 that supports PBCH enhancement for NR Light communications in accordance with aspects of the present disclosure. The operations of method 2500 may be implemented by a base station 105 or its components as described herein. For example, the operations of method 2500 may be performed by a communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2505, the base station may transmit an SSB to a UE, the SSB including an indication of a UE class supported by the SSB, where the UE class is based on a UE bandwidth. The operations of 2505 may be performed according to the methods described herein. In some examples, aspects of the operations of 2505 may be performed by an SSB transmitter as described with reference to FIGS. 16 through 19.

At 2510, the base station may determine that the UE belongs to the UE class supported by the SSB. The operations of 2510 may be performed according to the methods described herein. In some examples, aspects of the operations of 2510 may be performed by a UE class component as described with reference to FIGS. 16 through 19.

At 2515, the base station may establish or modifying a connection between the UE and the base station using the SSB based on the determination. The operations of 2515 may be performed according to the methods described herein. In some examples, aspects of the operations of 2515 may be performed by a connection establishment/modification component as described with reference to FIGS. 16 through 19.

Figure 26:
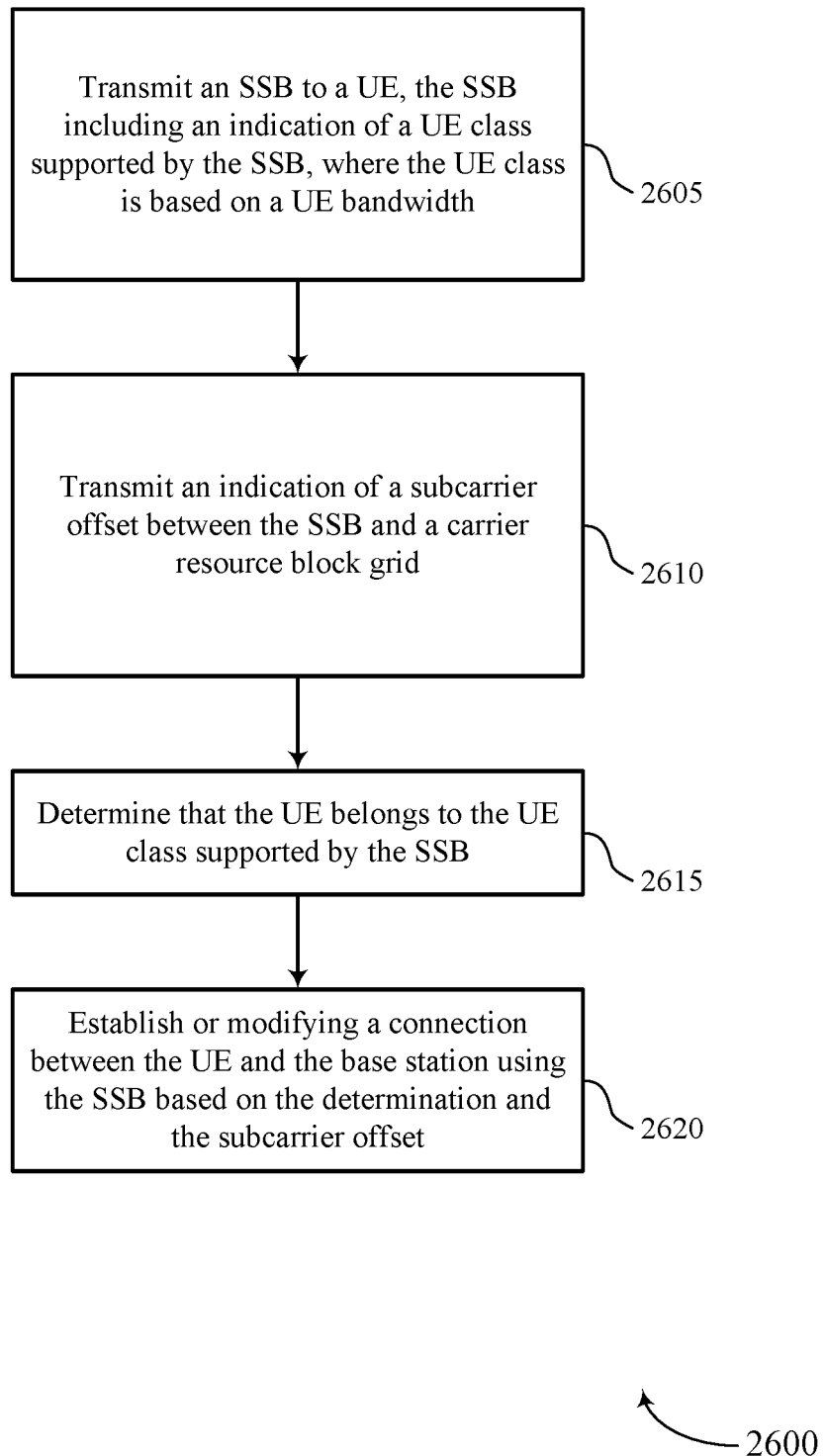

FIG. 26 shows a flowchart illustrating a method 2600 that supports PBCH enhancement for NR Light communications in accordance with aspects of the present disclosure. The operations of method 2600 may be implemented by a base station 105 or its components as described herein. For example, the operations of method 2600 may be performed by a communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2605, the base station may transmit an SSB to a UE, the SSB including an indication of a UE class supported by the SSB, where the UE class is based on a UE bandwidth. The operations of 2605 may be performed according to the methods described herein. In some examples, aspects of the operations of 2605 may be performed by an SSB transmitter as described with reference to FIGS. 16 through 19.

At 2610, the base station may transmit an indication of a subcarrier offset between the SSB and a CRB grid. The operations of 2610 may be performed according to the methods described herein. In some examples, aspects of the operations of 2610 may be performed by a subcarrier offset indicator as described with reference to FIGS. 16 through 19.

At 2615, the base station may determine that the UE belongs to the UE class supported by the SSB. The operations of 2615 may be performed according to the methods described herein. In some examples, aspects of the operations of 2615 may be performed by a UE class component as described with reference to FIGS. 16 through 19.

At 2620, the base station may establish or modifying a connection between the UE and the base station using the SSB based on the determination and the subcarrier offset. The operations of 2620 may be performed according to the methods described herein. In some examples, aspects of the operations of 2620 may be performed by a connection establishment/modification component as described with reference to FIGS. 16 through 19.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method of wireless communication, comprising: receiving a synchronization signal block at a UE, the synchronization signal block comprising an indication of a UE class supported by the synchronization signal block, wherein the UE class is based at least in part on a UE bandwidth; determining, based at least in part on the indication, that the UE belongs to the UE class supported by the synchronization signal block; and establishing or modifying a connection between the UE and a base station using the synchronization signal block based at least in part on the determination.

Aspect 2: The method of aspect 1, wherein receiving the synchronization signal block comprises: receiving an indication of a subcarrier offset between the synchronization signal block and a carrier resource block grid, wherein establishing or modifying the connection between the UE and the base station is based at least in part on the subcarrier offset.

Aspect 3: The method of aspect 2, wherein the indication of the UE class supported by the synchronization signal block is based at least in part on a range within which the subcarrier offset falls.

Aspect 4: The method of any of aspects 2 through 3, wherein the indication of the subcarrier offset is based at least in part on a combination of a first set of one or more bits in a first field of the synchronization signal block and a second set of one or more bits in a second field of the synchronization signal block.

Aspect 5: The method of aspect 4, further comprising: determining a valid range of the subcarrier offset based at least in part on the UE class supported by the synchronization signal block, wherein establishing or modifying the connection between the UE and the base station is further based at least in part on the subcarrier offset in the synchronization signal block falling within the valid range.

Aspect 6: The method of any of aspects 1 through 5, wherein the receiving the synchronization signal block comprises: receiving one or more bits explicitly indicating the UE class supported by the synchronization signal block.

Aspect 7: The method of any of aspects 1 through 6, further comprising: receiving repetition information for a broadcast channel from the base station, wherein the repetition information is based at least in part on the UE class supported by the synchronization signal block.

Aspect 8: The method of aspect 7, wherein the repetition information comprises one or more of: an indication of support for intra-slot repetition over the broadcast channel, an indication of support for inter-slot repetition over the broadcast channel, or a combination thereof.

Aspect 9: The method of any of aspects 7 through 8, wherein the repetition information comprises an indication of a number of transmission repetitions configured for the broadcast channel.

Aspect 10: The method of any of aspects 7 through 9, wherein the repetition information is received in one or more of a master information block, a physical layer payload of the broadcast channel, a demodulation reference signal scrambling identifier of the broadcast channel, or any combination thereof.

Aspect 11: The method of any of aspects 1 through 10, further comprising: receiving frequency hopping information for a broadcast channel from the base station, wherein the frequency hopping information is based at least in part on the UE class supported by the synchronization signal block.

Aspect 12: The method of aspect 11, wherein the frequency hopping information comprises one or more of: an indication of support for intra-slot frequency hopping over the broadcast channel, an indication of support for inter-slot frequency hopping over the broadcast channel, or a combination thereof.

Aspect 13: The method of any of aspects 11 through 12, wherein the frequency hopping information is received in one or more of a master information block, a physical layer payload of the broadcast channel, a demodulation reference signal scrambling identifier of the broadcast channel, or any combination thereof.

Aspect 14: The method of any of aspects 1 through 13, further comprising: determining, based at least in part on the UE class supported by the synchronization signal block, a multiplexing pattern for the synchronization signal block, a control resource set for broadcast control information, and a system information block.

Aspect 15: The method of aspect 14, wherein determining the multiplexing pattern based at least in part on the UE class supported by the synchronization signal block comprises: mapping the multiplexing pattern to a combination of the UE bandwidth, a subcarrier spacing associated with the synchronization signal block, and a subcarrier spacing of the broadcast control information of the control resource set.

Aspect 16: The method of any of aspects 1 through 15, wherein establishing or modifying the connection comprises: receiving system information in the synchronization signal block; and performing, based at least in part on the system information, one or more of: a radio resource control (RRC) connection establishment procedure, an RRC connection reconfiguration procedure, or an RRC release procedure.

Aspect 17: A method of wireless communication at a base station, comprising: transmitting a synchronization signal block to a UE, the synchronization signal block comprising an indication of a UE class supported by the synchronization signal block, wherein the UE class is based at least in part on a UE bandwidth; determining that the UE belongs to the UE class supported by the synchronization signal block; and establishing or modifying a connection between the UE and the base station using the synchronization signal block based at least in part on the determination.

Aspect 18: The method of aspect 17, wherein transmitting the synchronization signal block comprises: transmitting an indication of a subcarrier offset between the synchronization signal block and a carrier resource block grid, wherein establishing or modifying the connection between the UE and the base station is based at least in part on the subcarrier offset.

Aspect 19: The method of any of aspects 17 and 18, wherein determining that the UE belongs to the UE class comprises: receiving, from the UE, capability information indicating the UE class.

Aspect 20: The method of any of aspects 17 through 18, wherein the transmitting the synchronization signal block comprises: transmitting one or more bits explicitly indicating the UE class supported by the synchronization signal block.

Aspect 21: The method of any of aspects 17 through 20, further comprising: transmitting repetition information for a broadcast channel to the UE, wherein the repetition information is based at least in part on the UE class supported by the synchronization signal block.

Aspect 22: The method of any of aspects 17 through 21, further comprising: transmitting frequency hopping information for a broadcast channel to the UE, wherein the frequency hopping information is based at least in part on the UE class supported by the synchronization signal block.

Aspect 23: An apparatus comprising a processor; memory coupled with the processor; and instructions stored in the memory and executable by the processor to cause the apparatus to perform a method of any of aspects 1 through 15.

Aspect 24: An apparatus comprising at least one means for performing a method of any of aspects 1 through 15.

Aspect 25: A non-transitory computer-readable medium storing code the code comprising instructions executable by a processor to perform a method of any of aspects 1 through 15.

Aspect 26: An apparatus comprising a processor; memory coupled with the processor; and instructions stored in the memory and executable by the processor to cause the apparatus to perform a method of any of aspects 17 through 22.

Aspect 27: An apparatus comprising at least one means for performing a method of any of aspects 17 through 22.

Aspect 28: A non-transitory computer-readable medium storing code the code comprising instructions executable by a processor to perform a method of any of aspects 17 through 22.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   a processor;
   memory coupled with the processor; and
   instructions stored in the memory and executable by the processor to cause the apparatus to:
   receive a synchronization signal block at a user equipment (UE), the synchronization signal block comprising an indication of a UE class supported by the synchronization signal block, wherein the UE class is based at least in part on a UE bandwidth, wherein the UE belongs to the UE class supported by the synchronization signal block; and
   decode the synchronization signal block based at least in part on the UE belonging to the UE class supported by the synchronization signal block in accordance with the indication.

2. The apparatus of claim 1, wherein the instructions to receive the synchronization signal block are executable by the processor to cause the apparatus to:
   receive an indication of a subcarrier offset between the synchronization signal block and a carrier resource block grid.

3. The apparatus of claim 2, wherein the indication of the UE class supported by the synchronization signal block is based at least in part on a range within which the subcarrier offset falls.

4. The apparatus of claim 2, wherein the indication of the subcarrier offset is based at least in part on a combination of a first set of one or more bits in a first field of the synchronization signal block and a second set of one or more bits in a second field of the synchronization signal block.

5. The apparatus of claim 4, wherein the instructions are further executable by the processor to cause the apparatus to:
   determine a valid range of the subcarrier offset based at least in part on the UE class supported by the synchronization signal block.

6. The apparatus of claim 1, wherein the instructions to receive the synchronization signal block are executable by the processor to cause the apparatus to:
   receive one or more bits explicitly indicating the UE class supported by the synchronization signal block.

7. The apparatus of claim 1, wherein the instructions are further executable by the processor to cause the apparatus to:
   receive repetition information for a broadcast channel from a network device, wherein the repetition information is based at least in part on the UE class supported by the synchronization signal block.

8. The apparatus of claim 7, wherein the repetition information comprises one or more of: an indication of support for intra-slot repetition over the broadcast channel, an indication of support for inter-slot repetition over the broadcast channel, or a combination thereof.

9. The apparatus of claim 7, wherein the repetition information comprises an indication of a number of transmission repetitions configured for the broadcast channel.

10. The apparatus of claim 7, wherein the repetition information is received in one or more of: a master information block, a physical layer payload of the broadcast channel, a demodulation reference signal scrambling identifier of the broadcast channel, or any combination thereof.

11. The apparatus of claim 1, wherein the instructions are further executable by the processor to cause the apparatus to:
    receive frequency hopping information for a broadcast channel from a network device, wherein the frequency hopping information is based at least in part on the UE class supported by the synchronization signal block.

12. The apparatus of claim 11, wherein the frequency hopping information comprises one or more of: an indication of support for intra-slot frequency hopping over the broadcast channel, an indication of support for inter-slot frequency hopping over the broadcast channel, or a combination thereof.

13. The apparatus of claim 11, wherein the frequency hopping information is received in one or more of: a master information block, a physical layer payload of the broadcast channel, a demodulation reference signal scrambling identifier of the broadcast channel, or any combination thereof.

14. The apparatus of claim 1, wherein the instructions are further executable by the processor to cause the apparatus to:
    determine, based at least in part on the UE class supported by the synchronization signal block, a multiplexing pattern for the synchronization signal block, a control resource set for broadcast control information, and a system information block.

15. The apparatus of claim 14, wherein the instructions to determine the multiplexing pattern for the synchronization signal block based at least in part on the UE class supported by the synchronization signal block are executable by the processor to cause the apparatus to:
    map the multiplexing pattern to a combination of the UE bandwidth, a subcarrier spacing associated with the synchronization signal block, and a subcarrier spacing of the broadcast control information of the control resource set.

16. The apparatus of claim 1, wherein the instructions are further executable by the processor to cause the apparatus to:
    receive system information in the synchronization signal block; and
    perform, based at least in part on the system information, one or more of: a radio resource control (RRC) connection establishment procedure, an RRC connection reconfiguration procedure, or an RRC release procedure.

17. An apparatus, comprising:
a processor;
memory coupled with the processor; and
instructions stored in the memory and executable by the processor to cause the apparatus to:
transmit a synchronization signal block to a user equipment (UE), the synchronization signal block comprising an indication of a UE class supported by the synchronization signal block, wherein the UE class is based at least in part on a UE bandwidth, wherein the UE belongs to the UE class supported by the synchronization signal block; and
determine to multiplex the synchronization signal block based at least in part on the UE belonging to the UE class supported by the synchronization signal block in accordance with the indication.

18. The apparatus of claim 17, wherein the instructions to transmit the synchronization signal block are executable by the processor to cause the apparatus to:
transmit an indication of a subcarrier offset between the synchronization signal block and a carrier resource block grid.

19. The apparatus of claim 17, wherein the instructions to transmit the synchronization signal block are executable by the processor to cause the apparatus to:
transmit one or more bits explicitly indicating the UE class supported by the synchronization signal block.

20. The apparatus of claim 17, wherein the instructions are further executable by the processor to cause the apparatus to:
transmit repetition information for a broadcast channel to the UE, wherein the repetition information is based at least in part on the UE class supported by the synchronization signal block.

21. The apparatus of claim 17, wherein the instructions are further executable by the processor to cause the apparatus to:
transmit frequency hopping information for a broadcast channel to the UE, wherein the frequency hopping information is based at least in part on the UE class supported by the synchronization signal block.

22. The apparatus of claim 17, wherein the instructions to determine that the UE belongs to the UE class are further executable by the processor to cause the apparatus to:
receive, from the UE, capability information indicating the UE class.

23. A method of wireless communication, comprising:
receiving a synchronization signal block at a user equipment (UE), the synchronization signal block comprising an indication of a UE class supported by the synchronization signal block, wherein the UE class is based at least in part on a UE bandwidth, wherein the UE belongs to the UE class supported by the synchronization signal block; and
decoding the synchronization signal block based at least in part on the UE belonging to the UE class supported by the synchronization signal block in accordance with the indication.

24. The method of claim 23, wherein receiving the synchronization signal block comprises:
receiving an indication of a subcarrier offset between the synchronization signal block and a carrier resource block grid.

25. The method of claim 23, wherein the receiving the synchronization signal block comprises:
receiving one or more bits explicitly indicating the UE class supported by the synchronization signal block.

26. The method of claim 23, further comprising:
receiving repetition information for a broadcast channel from a network device, wherein the repetition information is based at least in part on the UE class supported by the synchronization signal block.

27. The method of claim 23, further comprising:
receiving frequency hopping information for a broadcast channel from a network device, wherein the frequency hopping information is based at least in part on the UE class supported by the synchronization signal block.

28. A method of wireless communication at a network device, comprising:
transmitting a synchronization signal block to a user equipment (UE), the synchronization signal block comprising an indication of a UE class supported by the synchronization signal block, wherein the UE class is based at least in part on a UE bandwidth, wherein the UE belongs to the UE class supported by the synchronization signal block; and
decoding the synchronization signal block based at least in part on the UE belonging to the UE class supported by the synchronization signal block in accordance with the indication.

29. The method of claim 28, wherein transmitting the synchronization signal block comprises:
transmitting an indication of a subcarrier offset between the synchronization signal block and a carrier resource block grid.

30. The method of claim 28, wherein the transmitting the synchronization signal block comprises:
transmitting one or more bits explicitly indicating the UE class supported by the synchronization signal block.

31. The method of claim 28, further comprising:
transmitting repetition information for a broadcast channel to the UE, wherein the repetition information is based at least in part on the UE class supported by the synchronization signal block.

32. The method of claim 28, further comprising:
transmitting frequency hopping information for a broadcast channel to the UE, wherein the frequency hopping information is based at least in part on the UE class supported by the synchronization signal block.

* * * * *